US006541768B2

(12) United States Patent
Andrien, Jr. et al.

(10) Patent No.: US 6,541,768 B2
(45) Date of Patent: *Apr. 1, 2003

(54) MULTIPLE SAMPLE INTRODUCTION MASS SPECTROMETRY

(75) Inventors: Bruce A. Andrien, Jr., Branford, CT (US); Craig M. Whitehouse, Branford, CT (US); Shida Shen, Durham, CT (US); Michael A. Sansone, Hamden, CT (US)

(73) Assignee: Analytica of Branford, Inc., Branford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/813,396

(22) Filed: Mar. 21, 2001

(65) Prior Publication Data

US 2001/0013579 A1 Aug. 16, 2001

Related U.S. Application Data

(63) Continuation of application No. 09/151,501, filed on Sep. 11, 1998, now Pat. No. 6,207,954.

(60) Provisional application No. 60/058,683, filed on Sep. 12, 1997, provisional application No. 60/076,118, filed on Feb. 27, 1998, and provisional application No. 60/087,256, filed on May 29, 1998.

(51) Int. Cl.[7] .......................... B01D 59/44; H01J 49/00

(52) U.S. Cl. ....................................... 250/288; 257/281

(58) Field of Search ................................ 250/285, 282, 250/281, 288

(56) References Cited

U.S. PATENT DOCUMENTS

| | | | | |
|---|---|---|---|---|
| 5,306,412 A | * | 4/1994 | Whitehouse et al. | 250/288 |
| RE34,757 E | * | 10/1994 | Smith et al. | 250/288 |
| 5,495,108 A | * | 2/1996 | Apffel et al. | 250/288 |
| 5,668,370 A | * | 9/1997 | Yano et al. | 250/285 |
| 5,868,322 A | * | 2/1999 | Loucks et al. | 239/418 |
| 5,872,010 A | * | 2/1999 | Karger et al. | 436/173 |
| 6,326,616 B1 | * | 12/2001 | Andrien et al. | 250/288 |

* cited by examiner

*Primary Examiner*—Bruce Anderson
(74) *Attorney, Agent, or Firm*—Levisohn, Lerner, Berger & Langsam, LLP

(57) ABSTRACT

Multiple sample introduction means have been configured in Atmospheric Pressure Ion sources which are interfaced to mass analyzers. Different samples can be introduced through multiple Electrospray (ES) or Atmospheric Pressure Chemical Ionization (APCI) probes individually or simultaneously and ionized. The gas phase ion mixture resulting from individual solutions sprayed from multiple ES or APCI probe inputs is mass analyzed. In this manner a calibration solution can be introduced through one ES or APCI probe while one or more sample solutions are spray from additional probes. Simultaneous spraying of calibration and sample solutions, results in an acquired mass spectrum containing peaks of ions with known molecular weights as well as sample related peaks. The calibration peaks can be used as an internal calibration standard during data analysis. Acquisition of mass spectra containing internal calibration peaks can be achieved by spraying different solutions simultaneously from multiple inlet probes without having to mix calibration and sample solutions in the liquid phase. Arrangements of ES and APCI probes can be configured in one API source chamber and the solution flow through any combination of ES or APCI probes can be switched on or off during an analytical run. A single mass analyzer can serve as a detector for multiple separation systems each delivering sample solution through separate ES or APCI inlet probes into an atmospheric pressure ion source.

75 Claims, 17 Drawing Sheets

MULTIPLE SAMPLE INTRODUCTION MASS SPECTROMETRY

RELATED APPLICATIONS

The present application is a continuation of U.S. Non-provisional application Ser. No. 09/151,501 filed Sep. 11, 1998, now U.S. Pat. No. 6,207,954, which is a U.S. Provisional Application Ser. No. 60/058,683, filed Sep. 12, 1997, U.S. Provisional Application Ser. No. 60/076,118, filed Feb. 27, 1998, and U.S. Provisional Application Ser. No. 60/087,256, filed May 29, 1998, the disclosures of which are fully incorporated herein by reference.

BACKGROUND OF THE INVENTION

Atmospheric Pressure Ionization (API) Sources including Electrospray (ES), Atmospheric Pressure Chemical Ionization (APCI) and Inductively Coupled Plasma (ICP) ion sources interfaced to mass analyzers are typically operated with a single sample introduction probe. In mass spectrometric applications where internal standards are required, additional components can be added to the primary sample solution where the resulting mixture is delivered through one probe into the API source. The mixture of compounds in a single solution introduced through the same probe are ionized and mass analyzed. A known sample when mixed with an unknown sample can serve as an internal mass scale or quantitation calibration standard for the unknown components peaks appearing in the mass spectrum acquired in this manner. However, mixing a known compound calibration solution with an unknown sample solution can have undesired analytical consequences. The known and unknown solution components may effect one another in an unpredictable manner during the solution transport or ionization process. One component may react with another in solution or one or more components may suppress the ionization efficiency of other components during the ionization process. A solution with a known component mixture may be difficult to eliminate as a source of chemical contamination in a probe which is running a series of unknown samples at the trace component level. If it is desirable to deliver a known solution as a mixture through the sample introduction probe on an intermittent basis, the occasional sample introduction will be subject to the constraints of solution flow rates through the probe, efficiency of mixing solutions, dead volume losses and flushing of the probe to eliminate the known solution prior to the next analysis. The invention avoids performance and sample introduction problems encountered when mixing liquid samples prior to ionization in an API source, by conducting simultaneous mass analysis of two different solutions without the need to mix solutions in the same probe prior to analysis. One aspect of the invention is the configuration and simultaneous operation of multiple probes or multiple sprayers or nebulizers within a probe assembly through which different sample solutions can be introduced simultaneously into an API source during operation.

In one embodiment of the invention, multiple sample introduction means have been configured in Electrospray Atmospheric Pressure Ion sources which are interfaced to mass analyzers. At least two sample introduction Electrospray probes are operated simultaneously in an Electrospray ion source. At least one ES probe is supplied a sample which is different from the sample solution supplied to additional ES probes operating within the same ES source chamber. In this manner a calibration solution can be introduced through one ES probe while an unknown sample is introduced through another ES probe or second channel within the same ES probe assembly. Ions produced from both solutions via the simultaneous spraying of both ES probes blend or mix in the atmospheric pressure ES chamber background gas prior to entering the orifice into vacuum. The mixture of ions resulting from the solutions delivered from at least two ES probes is simultaneously mass to charge (m/z) analyzed resulting in a mass spectrum containing an internal standard for calibrating or tuning the mass analyzer. The internal calibration standard contained within the acquired mass spectrum is achieved without mixing known and unknown samples in solution. Simultaneous introduction of different samples through multiple ES probes also enables the study of mixed ion and molecule reactions at atmospheric pressure in the ES source chamber prior to introduction into vacuum. Each ES sample introduction probe assembly can be configured with nebulization gas and liquid layered flow. An internal calibration solution can be included in the layered flow or the primary flow of any given ES probe configured in the ES source chamber. The individual sample solution flows or nebulization gas flows to any combination of ES probes can be switched on or off during an analytical run without the need to reposition probes. In another aspect of the invention, an Atmospheric Pressure Chemical Ionization (APCI) source assembly can be configured with multiple inlet channels or probes. These multiple APCI inlet probes can include pneumatic nebulization and the solution and gas flow supplied to each inlet probe can be individually or simultaneously turned on or off. In both the ES and APCI sources, multiple probe sample solution ionization can be controlled without the need to reposition probes by switching voltages, controlling the nebulization gas flows or controlling the sample solution flows. Configurations of multiple sample introduction inlet probes can also be extended to a system that has a combination of both Electrospray and APCI ion production means in the same API chamber. Each ES or APCI sample inlet probe can include pneumatic or ultrasonic nebulization.

Configurations of Electrospray ion sources which include more than one sample introduction needle or nebulizer have been described in the literature. Kostianinen and Bruins, Proceedings of the 41st ASMS Conference on Mass Spectrometry, 744a, 1993, described the configuration and use of an assembly of multiple Electrospray inlet tips with and without pneumatic nebulization mounted in an Electrospray ion source. Each ES tip was supplied the same sample solution delivered from a single pump with a single solution source. The sample solution, delivered from a liquid chromatography pump, flowed into an assembly or array of one, two or four ES or pneumatic nebulization assisted ES sprayer tips in an attempt to improve ion signal intensity at higher liquid flow rates. In the arrangement reported, the solution flow to individual sprayer tips could not be turned on and off independently and different solutions could not be introduced selectively to individual sprayer tips in the assembly of multiple ES sprayer tips.

Rachel R. Ogorzalek Loo, Harold R. Udseth, and Richard D. Smith, Proceedings of the 39th ASMS Conference on Mass Spectrometry and Allied Topics, 266–267, 1991 and J. Phys. Chem., 6412–6415, 1991 and Richard D. Smith, Joseph A. Loo, Rachel R. Ogorzalek Loo, Mark Busman, and Harold R. Udseth, Mass Spectrometry Reviews, 10, 359–451,1991 describe the configuration of an Electrospray ion source interfaced to a quadruple mass analyzer apparatus which included dual Electrospray ion sources delivering ions to two separate entrance apertures of a Y shaped capillary. Positive ions created in one Electrospray source were introduced into one inlet branch of the Y shaped capillary and negative ions created from the second Electrospray ion source were introduced into the second inlet branch of the Y shaped capillary. The positive and negative ions swept into the two entrance orifices of the capillary tube began mixing where the two inlet branches of the capillary tube met well downstream of the capillary entrances located in the two ES atmospheric pressure source chambers. Dual Electrospray ionization sources or a separate ES source and a gas phase corona discharge source individually delivered ions into two entrance orifices of a Y shaped capillary. For all experiments reported, the first ES source produced ions of opposite polarity to the second ES or gas phase corona discharge source. The opposite polarity ions produced in separate ion sources were not mixed in the atmospheric pressure ion source but entered a split capillary tube at two separate entrance orifices and mixed in partial vacuum downstream in the capillary tube.

Bordoli, Woolfit and Bateman, Proceedings of the 43th ASMS Conference on Mass Spectrometry and Allied Topics, 98, 1995 described an Electrospray ion source which included a calibration ES probe configured with a second microtip (50 nl/min flow rate) sample probe interfaced to a magnetic sector mass analyzer. The sample probe included a microtip attached directly to a syringe needle. The syringe was mounted on an X-Y-Z positioning stage to optimize the position of the microtip sprayer. The calibration ES probe was configured such that it could be moved into a position when a calibration solution was sprayed at 500 nl/min while no sample flowed through the primary ES sample probe. After acquisition of a calibration mass spectrum, the calibration ES probe was retracted and the calibration solution flow turned off. The sample flow through the microtip sample ES probe was then turned on and a separate mass spectrum was acquired from the Electrosprayed ions produced. In this manner, an external calibration mass spectrum was acquired prior to acquisition of a mass spectrum of the primary sample. The calibration mass spectrum and the sample mass spectrum were then added together in the data system prior to calculating the mass assignment of the sample related peaks. For the ES source configuration reported, the two ES probes were not operated simultaneously and no gas phase mixture of calibration and sample ions was created at atmospheric pressure and no mass spectrum was acquired from a mixture of calibration and sample ions. No single mass spectrum was acquired which included sample related peaks and calibration compound related peaks with the apparatus described. Neither ES probe described was configured to operate with pneumatic nebulization assisted Electrospray. The ES calibration probe position required adjustment prior to acquiring a calibration spectrum to enable effective spaying near the orifice into vacuum. After acquisition of a calibration mass spectrum, the ES calibration probe was retracted to avoid interference prior to the mass spectrum acquisition from the sample solution delivered through the primary ES probe.

In one embodiment of the invention described, multiple samples are introduced into an API source simultaneously where ions are produced from all samples and mixed in the atmospheric pressure ion source chamber. A portion of the gas phase ion mixture is then swept into vacuum through an orifice or capillary where the ions are mass analyzed. In this manner a solution containing calibration compounds can be ionized simultaneously with a sample solution resulting in an acquired mass spectrum containing an internal standard without mixing calibration components and sample components in solution. Higher mass accuracy's can be achieved with an internal standard when m/z assignments are calculated for sample ion related peaks in an acquired mass spectrum. In addition to independently introducing calibration compounds in an API source, multiple sample inlet probes can be used to introduce multiple samples individually or simultaneously into an API source. Mounting multiple probes in an API chamber such as ES and APCI probes, allows multiple ionization techniques to be run individually or simultaneously in a single API source assembly. Multiple Electrospray probes can be configured to collectively provide optimal performance over a wide range of sample flow rates and solution chemistries. ES probe positions can be configured to fall directly on the vacuum orifice centerline to a position angled to well over 100 degrees off the centerline. Different liquid flow rates can be delivered to separate ES or APCI probes within the same API source. ES and/or APCI probes mounted at different positions in the ES source chamber, can operate simultaneously, in pairs or in groups at different flow rates and introducing different sample solutions. The multiple ES probes may be operated with or without nebulization assist.

SUMMARY OF THE INVENTION

One embodiment of the invention is the configuration of an API source with multiple sample solution inlets, connected to different sample delivery systems, interfaced to a mass analyzer. Individual sample inlet probes can be operated independently or simultaneously in the same API source chamber. The composition and flow rate of solution introduced through each individual API probe can be controlled independently from other sample introduction ES, APCI or ICP probes. Multiple samples are introduced into the API source through multiple API probes without mixing separate sample components in solution prior to solution spraying and ionization. Ionization of components from multiple sample solutions occurs in the gas phase at or near atmospheric pressure. The API source may include but is not limited to Electrospray, APCI or ICP ionization means or combinations of each ionization technique. Another aspect of the invention is the technique of introducing a calibration solution into at least one API source inlet probe and the sample of interest through another API source inlet probe. Both calibration and sample solutions are introduced through separate inlet probes but are sprayed and ionized simultaneously in the API source resulting in a mixture of gas phase calibration and sample related ions. A portion of the resulting ion mixture is mass analyzed producing a mass spectrum which includes known component ion peaks that can serve as an internal standard to improve m/z measurement and even quantitation accuracy. Alternatively, multiple sample solutions can be introduced separately but simultaneously creating a mixture of ions at or near atmospheric pressure to study gas phase ion and molecule interactions and reactions. Multiple inlet probe API sources can be interfaced to any MS or $MS/MS^n$ mass analyzer type including but not limited to, Time-Of-Flight (TOF), Quadrupole, Fourier Transform (FTMS), Ion Trap, Magnetic Sector or a Hybrid mass analyzer.

In one embodiment of the invention, an Electrospray ion source is configured with multiple Electrospray probes. Each probe may or may not be configured with pneumatic or ultrasonic nebulization assist and/or a second liquid layer. The multiple ES probes and each liquid layer of each ES probe may be connected to different liquid delivery systems. In this manner, different samples, mixture of samples and/or solvents can be sprayed simultaneously or individually in a variety of combinations. The liquid delivery systems include but are not limited to liquid chromatography pumps, syringe pumps, gravity feed vessels, pressurized vessels, and or aspiration feed vessels. Samples may also be introduced using auto injectors, separation systems such as liquid chromatography (LC) or capillary electrophoresis (CE), capillary electrophoresis chromatography (CEC) and/or manual injection values connected to any or all ES probes. Multiple and independent solution introduction allows multiple samples to be analyzed simultaneously with Electrospray ionization without changing ES probe positions. The ability to introduce sample solution through one ES probe and have the option to selectively and simultaneously introduce additional secondary samples into the ES chamber through other ES probes can be used to generate mass spectra, even on-line during LC or CE separations, with internal or external calibration standards. Different sample mixtures which span a range of m/z values or sample types can be introduced through different ES probes. Depending on the unknown sample being analyzed, an optimal calibration solution can be chosen from another ES probe. For example one m/z range calibration solution can be chosen which produces singly charged ES ions when analyzing singly charged compounds and likewise multiple charged ES generated calibration ions can be produced when analyzing compounds which form multiply charged ions in Electrospray ionization. The solution flow for any secondary ES probe can be controlled independent of the solution flow to a primary ES sample solution probe without having to change or adjust any probe position, change the ES source voltages, shut off the primary sample solution flow or contaminate the solution being introduced through the primary sample solution probe. Multiple probe sets can be operated simultaneously or in sequence with other probe sets in the same API chamber. The configuration and operation of multiple ES probes can facilitate API MS detection from multiple sample sources. In particular, multiple sample probes facilitates and improves the analytical throughput of unattended automated operation of a single mass analyzer as a detector for multiple Liquid Chromatography separations systems.

In another embodiment of the invention, multiple nebulizers are configured in an Atmospheric Pressure Chemical Ionization source. Similar to ES, multiple sample solutions can be introduced into the gas phase and ionized without mixing solutions. In this APCI source embodiment, multiple nebulizers spray individual sample bearing solutions into a vaporizer where the mixture of nebulized droplets is evaporated prior to ionization in the corona discharge region. Calibration solutions can be introduced through one or more sample inlet probes independently and simultaneously with sample solution introduction through yet another inlet probe. No adjustment to probe position, applied voltages or vaporizer temperature may be required when controlling the solution flow to multiple inlet probes. This independent sample flow control with little or no mechanical adjustment in an APCI source increases the system level analytical flexibility and sample throughput with manual or automated operation while minimizing multiple solution cross contamination. Multiple APCI and ES probes can be configured in one API source in another embodiment of the invention. The combination ES and APCI source expands the range of analytical capability of an API-MS instrument interfaced to a variety of separation systems particularly for automated operation with a variety of samples.

The use of multiple probes with API sources, including ES, APCI or ICP ionization techniques allows a more rapid introduction of samples particularly when a fast mass analyzer such as Time-Of-Flight is used. Rapid sample introduction can be limited by the cycle time of an LC, CE or CEC separation system or auto injector. Sample introduction cycle time can also be limited by the time it takes for an injected sample to travel from the injector valve to the ES or APCI probe outlet. Multiple LC, CE or CEC, auto injectors, injector valves and API probes can be configured to decrease the cycle time of sample introduction and analysis time of an API MS system.

DESCRIPTION OF THE INVENTION

Figure 1:
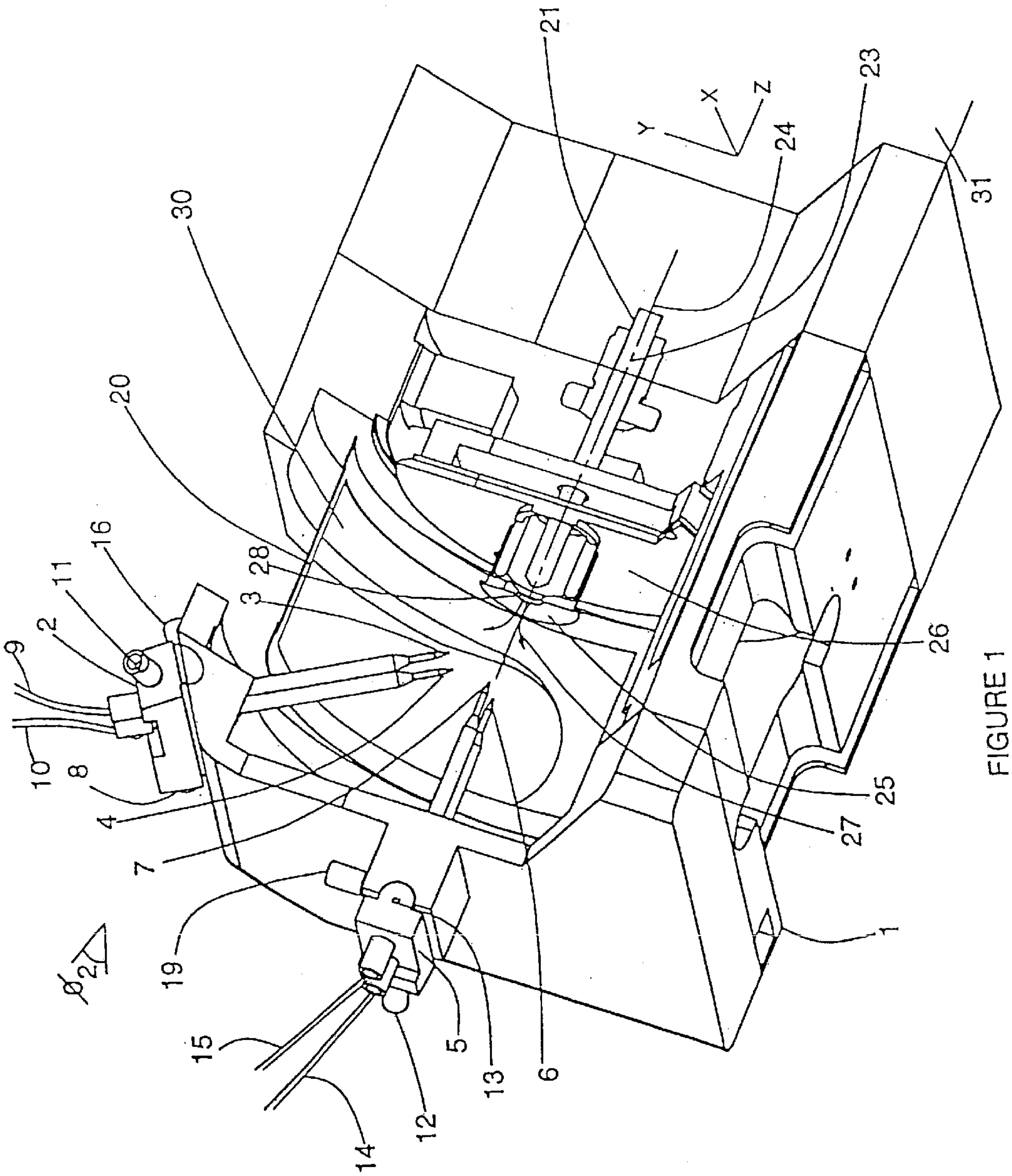
FIG. 1 is a diagram of an Electrospray ion source configured with multiple independent Electrospray probes installed.

One embodiment of the invention, as diagrammed in FIG. 1, comprises an Electrospray ion source which includes multiple Electrospray solution inlet probes. The Electrospray ion source is interfaced to a mass spectrometer which is configured in vacuum chamber 31. Individual Electrospray probe assemblies can be configured in the Electrospray ion source atmospheric pressure chamber 30 where solution is sprayed from individual probe tips at flow rates ranging from below 25 nl/min to above 1 mL/min. The spraying of a solution from an Electrospray tip may or may not include nebulization assist. Electrospray source assembly 1 includes two ES probe sets 2 and 5 each configured with dual ES tips. ES dual probe assembly 2 comprises two Electrospray tips 3 and 4 configured with pneumatic nebulization assist. Each ES tip 3 and 4 is supplied solution independently through delivery lines 9 and 10 respectively. ES sprayer tips 3 and 4 are located off center line or axis 24 of ES source 1 as defined by the centerline of capillary 21 orifice 23 into vacuum. A second ES dual probe assembly 5 is comprises two parallel ES tips 6 and 7 which are configured with pneumatic nebulization assist. Solution is independently supplied to ES tips 6 and 7 through solution delivery lines 14 and 15 respectively during ES operation. ES probe tips 6 and 7 are positioned near centerline 24 of ES source 1. Each ES dual probe assembly is configured to provide gas flow concentrically at tips 3, 4, 6 and 7 through gas supply lines 11, 8, 12 and 13 respectively. The gas flow to each ES probe tip can be controlled individually or collectively to allow ES operation with pneumatic nebulization assist or to provide gas such as oxygen or sulfur hexaflouride ($SF_6$) at an ES tip to suppress corona discharge during positive or negative Electrospray ion production. In the embodiment shown, solutions can be Electrosprayed from ES tips 3, 4, 5 and 6 individually or simultaneously or with combinations of simultaneous spraying from individual ES probe tips during Electrospray operation. A portion of the ions produced from the solutions Electrosprayed into ES chamber 30 are transported into vacuum through bore 23 in capillary 21 where they are mass to charge analyzed by a mass spectrometer and detector.

In the embodiment shown in FIG. 1, the axis of ES tips 3 and 4 are positioned to be approximately parallel in dual tip ES probe assembly 2. The position of ES probe assembly 2 can be adjusted in the x direction and rotationally, effectively moving ES tips 3 and 4 in the y direction. The position of ES probe tips 3 and 4 can be locked in place after adjustment with locking screw 16. The x and y ES tip position adjustment sets location and direction of the spray produced from probe tips 3 and 4 relative to centerline 24 of ES source 1. As will be explained in more detail below, the position adjustment allows optimization of the ion mixture delivered to vacuum when Electrospraying simultaneously from ES probe tips 2 and 3 over a wide range of liquid flow rates and solution chemistries. Similarly, the x and rotational or y positions ES tips 6 and 7 can be adjusted by moving ES probe assembly 5 and locking the position in place with locking screw 19. The x and y ES probe tip position adjustment, relative to ES source axis 24 and capillary orifice 23, allows optimization of performance when spraying sample solutions from ES probe tips 6 and 7 individually or simultaneously. As is diagrammed in FIG. 6, ES probe assemblies 2 and 5 may alternatively be configured to include fall x-y-z tip position adjustment. Depending on the initial ES dual probe assembly mounting position and the range of tip position adjustment, the orientation of the ES probe tip axis may be configured to extend over a range of angles from 0 to greater than 90 degrees relative to the x-z ES source plane. Zero degrees is defined as the z axis pointing into bore 23 of capillary 21. An ES probe tip axis, and consequently the centerline of an Electrospray plume produced, can be oriented maximize the production of ions near nose piece 25 opening 28 to optimize performance. Charged liquid droplets produced in the Electrospray or pneumatic nebulization assisted Electrospray process evaporate to form ions in Electrospray chamber 30 aided by heated countercurrent drying gas 27 flowing through endplate nosepiece opening 28. A portion of the ions formed in ES chamber 30 are directed into capillary bore 23 where they are swept into vacuum by the gas flow through capillary bore 23. Charged droplet evaporation can also occur during the transfer of partially evaporated Electrosprayed charged droplets into vacuum through capillary bore 23. Capillary 21 can be heated to aid in the charged droplet evaporation process. A detailed description of the invention is given below using the cross sections diagrams shown in FIGS. 2 and 3.

Figure 2:
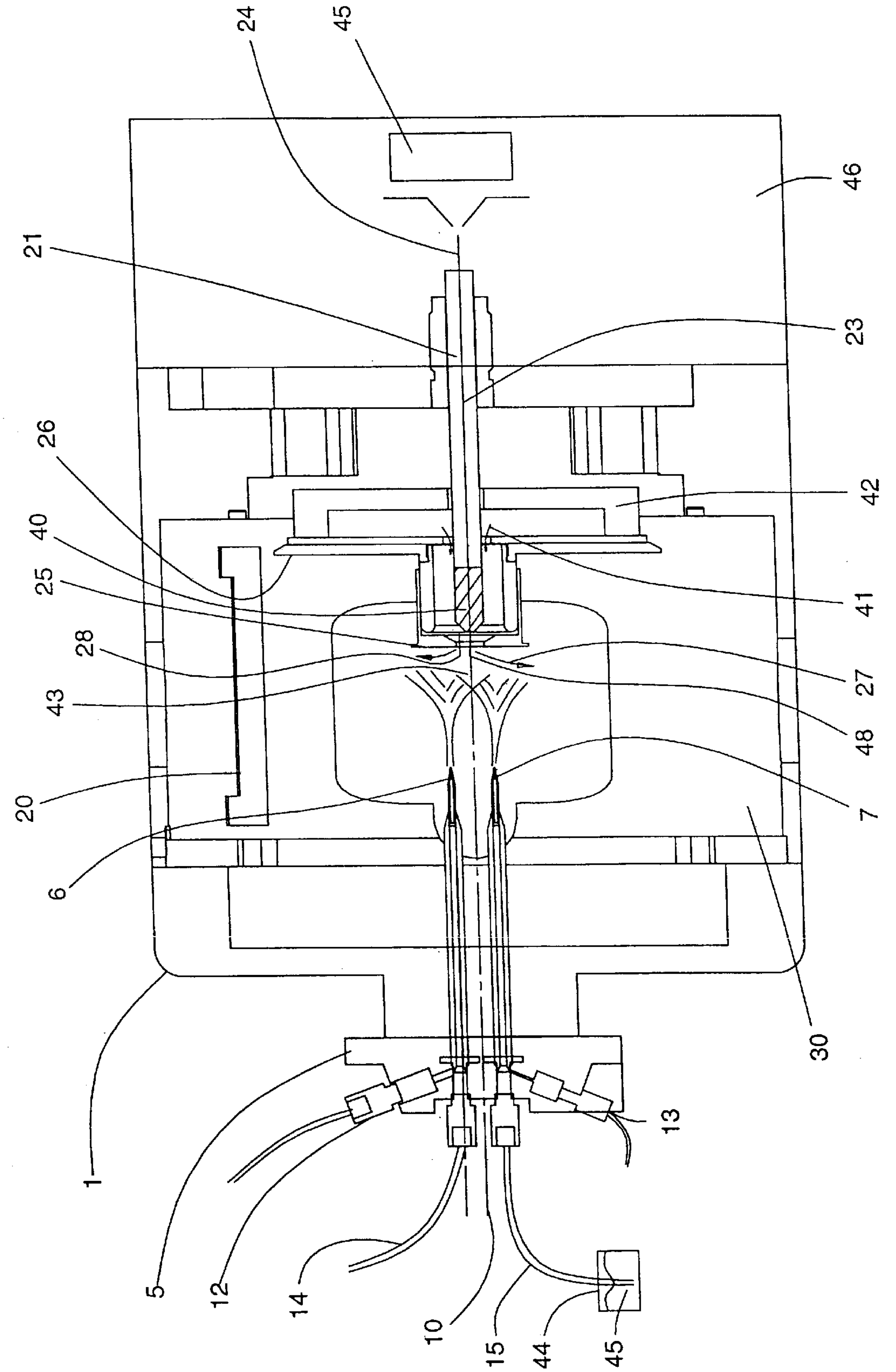
FIG. 2 is a diagram of the Electrospray ion source of FIG. 1 showing a cross section top view of the ES dual probe assembly positioned near the ES source centerline.
Figure 3:
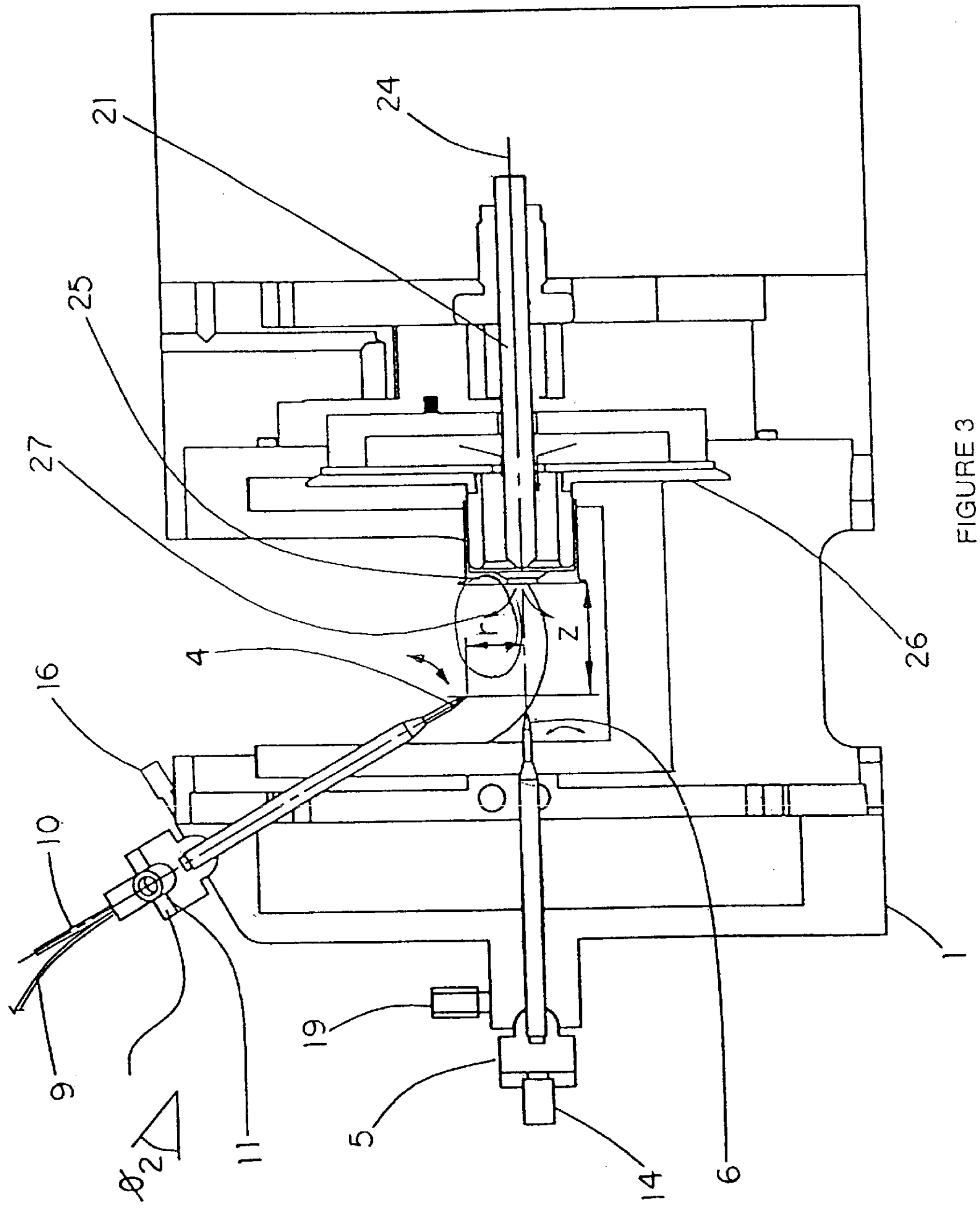
FIG. 3 is a diagram of the Electrospray ion source of FIG. 1 showing a cross section side view of a dual ES probe assembly configured off axis from the ES source centerline and an ES dual probe assembly positioned near the centerline.

FIG. 2 is a top view diagram of an Electrospray ion source 1 showing dual tip ES probe assembly 5. FIG. 3 is a side view of ES source 1 shown in FIG. 1 configured with dual off axis probe assembly 2 and 5. ES source 1, is operated by applying electrical potentials to cylindrical electrode 20, endplate electrode 26 and capillary entrance electrode 40 while maintaining all ES electrode tips at ground potential. Heated counter current drying gas flow 41 is directed to flow through endplate heater 42 and into ES source chamber 30 through endplate nosepiece 25 opening 28. The orifice into vacuum as shown in FIGS. 1 and 2 is a dielectric capillary tube 24 with entrance orifice 48. The potential of an ion being swept through dielectric capillary tube inner bore 23 into vacuum is described in U.S. Pat. No. 4,542,293. To produce positive ions, negative kilovolt potentials are applied to cylindrical electrode 20, endplate electrode 26 with attached electrode nosepiece 25 and capillary entrance electrode 40. Typically, for generating positive ions, −4,000, −3,500 and −3,000 Volts are applied to capillary entrance 40, endplate 26 and cylindrical electrode 20 respectively during Electrospray operation and ES probe assemblies 2 and 5 with ES tips 3, 4, 6 and 7 remain at ground potential. To produce negative ions, the polarity of the electrical potentials applied to electrodes 20, 26 and 40 are reversed while ES probe tips 3, 4, 6 and 7 remain at ground potential. Alternatively, if a nozzle, thin plate orifice or conductive metal capillaries are used as orifices into vacuum, kilovolt potentials can be applied to ES probe tips 3, 4, 6 and 7 with lower potentials applied to cylindrical electrode 20, endplate electrode 26 and the orifice into vacuum during operation. Alternatively, heated capillaries, nozzles or thin plate orifices can be configured as the orifice into vacuum operating with or without counter current drying gas during ES or APCI ionization.

Referring to FIG. 2, when the appropriate potentials are applied to elements 6, 7, 20, 26 and 40 in ES source chamber 30, charged liquid droplets are produced from the unassisted Electrospraying or Electrospraying with pneumatic nebulization assist of separate solutions delivered to ES tips 6 and 7. In the embodiment shown in FIG. 2, the position of ES tips 6 and 7 are fixed relative to each other during Electrospray operation. Alternatively, ES probe assembly can be configured to allow adjustment of the relative positions of tips 6 and 7. The charged droplets Electrosprayed from each solution exiting from ES tips 6 and 7 are driven by the electric field against the counter current drying gas flow 27. As the charged droplets evaporate, ions are formed from the components originally in the solutions delivered through tips 6 and 7, and mix in region 43. A portion of the mixture of ions in region 43 is swept into vacuum through the capillary bore 23 are directed into mass analyzer and detector 45, located in vacuum region 46, where they are mass analyzed. If a heated capillary is configured as an orifice into vacuum with or without counter current drying gas, a mixture of partially evaporated charged droplets sprayed from ES tips 6 and 7 are swept into the heated capillary orifice. Charged droplet evaporation and the production of a mixture of ions can occur in the capillary when Electrosprayed charged droplets are not completely evaporated in atmospheric pressure chamber 30 prior to being swept into the capillary orifice. The resulting ions produced from a mixture of charged droplets produced from two Electrosprayed solutions in the heated capillary will form an ion mixture in the capillary and in vacuum. Ions formed from multiple solutions can also be mixed and stored in ion traps in vacuum. Three dimensional ion traps and multipole ion guides operated in two dimensional trapping mode can hold mixtures of ions which are trapped simultaneously or sequentially from multiple solutions sprayed in one API source. Mass analysis of the ion mixtures is then conducted using mass analyzer and detector assembly 45.

For example, the multiple ES probe API source embodiment shown in FIG. 1 can be interfaced to a multipole ion guide Time-Of-Flight mass analyzer where the multipole ion guide is operated in two dimensional trapping mode as described in U.S. Pat. No. 5,689,111. Ions formed from spraying a solution from ES probe 7 can initially be trapped by a multipole ion guide operated in two dimensional trapping mode. The solution flow to ES probe 7 can then be turned off and a different solution flow through ES probe 6 turned on forming ions which are also trapped in the same multipole ion guide operating as a two dimensional trap. The ion mixture formed in this manner can be trapped for a period of time to promote ion-ion interactions or ion-molecule interactions and/or reactions with added neutral background gas. The resulting trapped ion mixture can then be released from the multipole ion guide trap and mass analyzed in the Time-Of-Flight mass analyzer. Alternatively, MS/MS$^n$ experiments can be conducted on the trapped ion population as is described in U.S. patent application Ser. No. 08/694.542.

Two different sample solutions can be sprayed from ES probe tips 6 and 7 independently or simultaneously during ES source operation. As described above, when two solutions are Electrosprayed, with or without pneumatic nebulization assist, simultaneously from ES probe tips 6 and 7, ions resulting from the two separate sprays mix in region 43. A portion of the ion mixture is swept into vacuum through capillary bore 23 and subsequently mass to charge analyzed. Using this embodiment of the invention, the sample solution from ES probe tip 6 has a minimum effect on the ions produced from the sample solution sprayed from ES probe tip 7. Chemical components in the sample solutions delivered from independent solution sources through ES probe tips 6 and 7 do not mix in solution prior to spraying. Charged droplets and ions of the same polarity are produced when Electrospraying from ES probe tips 6 and 7. Charged droplets and ions of like polarity have minimal chemical interaction during evaporation in ES chamber 30 due to charge repulsion so minimal distortion of the individual ion population produced from each solution occurs prior to entry into vacuum. Compounds of known molecular weight, referred to as calibration compounds, can be added to the solution sprayed from ES probe tip 6 while a sample solution is sprayed from ES probe tip 7. If the calibration and sample solutions are sprayed simultaneously from ES probe tips 6 and 7 respectively, the mass spectrum acquired from the resulting ion mixture contains a set of internal calibration peaks corresponding to the known molecular weight compounds included in the calibration solution. Using this embodiment of the invention a mass spectrum can be acquired containing an internal standard set of peaks without having mixed the calibration and sample compounds in solution. Known component and sample component ion mixing occurs in the gas phase prior to mass analysis. Alternatively, the solution flow through ES probe tips 6 and 7 can be turned on sequentially. If one ES probe contains a calibration solution, sequential spraying of ES probes 6 and 7 allows acquisition of a mass spectrum which can be used as an external standard close in time to the acquisition of the subsequent sample mass spectrum. The probe positions remain fixed during Electrospraying with MS acquisition while spraying simultaneously or separately in time. Including internal standards in an acquired mass spectrum allows increased accuracy in assignment of the molecular weights of sample related peaks contained in the spectrum. Internal standards in a mass spectrum can also serve to improve quantitative accuracy. Conventionally, to acquire a mass spectrum which includes an internal standard, calibration compounds are mixed with sample bearing solution prior to Electrospraying. Typically when acquiring a external calibration mass spectrum, the calibration solution is delivered through the same ES probe that the following sample solutions will flow through. Calibration compounds contaminant the transfer lines and ES probe tip internal bore and can result in unwanted peaks in a mass spectrum acquired from a sample solution. Mixing calibration compounds in solution, directly or through a layered flow Electrospray probe configuration, to create an internal standard in the resulting acquired mass spectrum, can also cause suppression of sample ion signal during the Electrospray ionization process. Mass calibration compounds contaminate sample delivery lines and are often difficult to eliminate when switching between applications that require internal standards, external standards or no calibration peaks in the acquired mass spectrum. Long flushing time may be required to remove calibration compounds from transfer lines and ES probe assemblies, adding to analysis time. Due to this contamination problem, mixing calibration solutions with sample solutions in the liquid phase does not allow rapid application and removal of calibration compounds during API source operation. The invention overcomes the analytical disadvantages of mixing calibration and sample solutions to acquire mass spectra containing internal standards. Simultaneous operation of multiple ES probes produces ions from independently spraying solutions that mix in the gas phase prior to mass analysis. Each independent ES probe spray can be rapidly turned on and off with no residual unwanted compound contamination appearing in subsequently acquired mass spectrum. The Electrospray generated ions are produced from charged droplets produced from separate sprayers. Any sample or calibration ion interaction is limited to those processes occurring in the gas phase. As the ions produced are of the same polarity, chemical interference through interaction in the gas phase is minimal. By varying relative solution component concentrations and compositions, the invention allows independent control of the intensities and m/z locations between the calibration and sample component peaks in an acquired mass spectrum.

Adjusting the location of the ion mixing region 43 relative to nose piece opening 28 and capillary entrance orifice 28, varies the ratio of ions from each spray which enter capillary bore 23. For a given calibration solution concentration, the calibration peak intensities relative to the sample peak intensities can be changed by moving probe assembly 5 in the x direction and locking with locking knob 19. Depending on the relative liquid flow rates and nebulization gas flow rates through probe ES tips 6 and 7 rotational adjustment of ES probe assembly 5 can also be used to change the placement of ion mixing region 43 relative to capillary entrance orifice 48 to optimize performance. For many analytical applications, it is desirable to maximize sample ion signal even while adding calibration component related peaks to the acquired mass spectrum. Adjustment of the position of ES probe assembly 5 with fixed relative ES probe tip positions allows introduction of calibration peaks in an acquired spectrum with minimum sample signal loss. The parallel ES tip configuration allows a wide range of liquid flow rates to be sprayed independently from each tip with efficient mixing of ions produced. Consequently, optimal performance over a wide range of analytical applications can be achieved using a parallel sprayer configuration without the need to re-adjust the position probe assembly 5. An example of a mass spectrum acquired while simultaneously Electrospraying solutions delivered at two different liquid flow rates through two ES tips is shown in FIGS. 4.

Figure 4A:
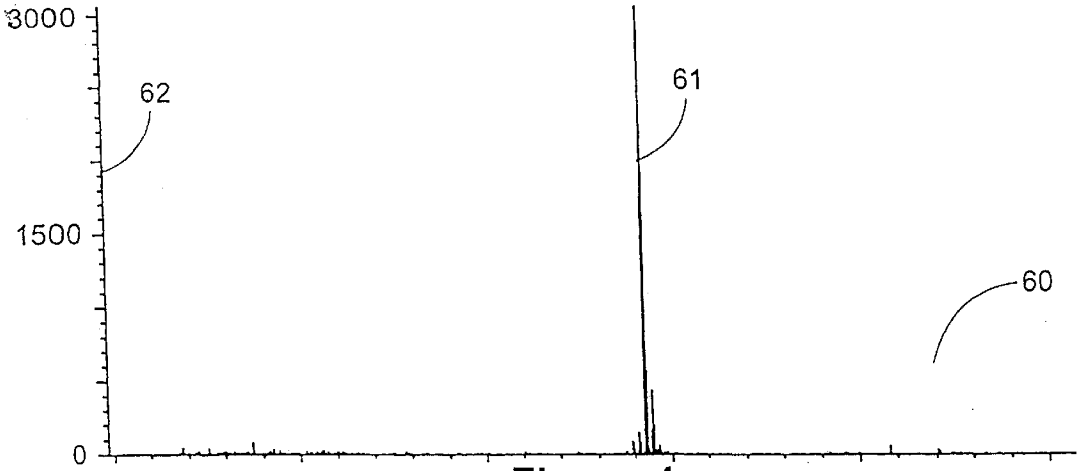
FIG. 4*a* is a mass spectrum of a sample solution containing the doubly charged peak of Gramicidin S Electrosprayed from one tip of a dual tip off axis ES probe operating with pneumatic nebulization assist.
Figure 4B:
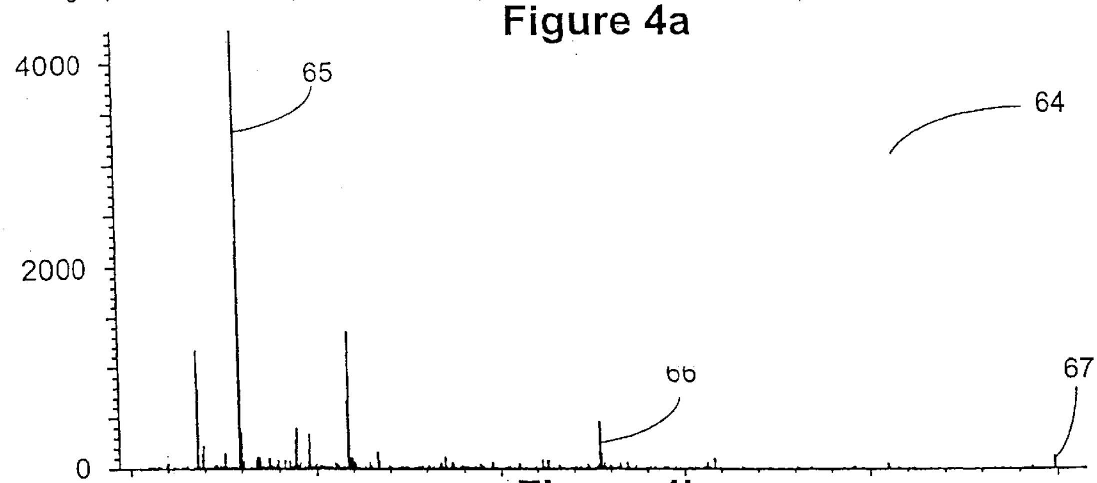
FIG. 4*b* is a mass spectrum of a calibration solution Electro sprayed with pneumatic nebulization assist from the second ES tip two of a dual tip off axis ES probe.
Figure 4C:
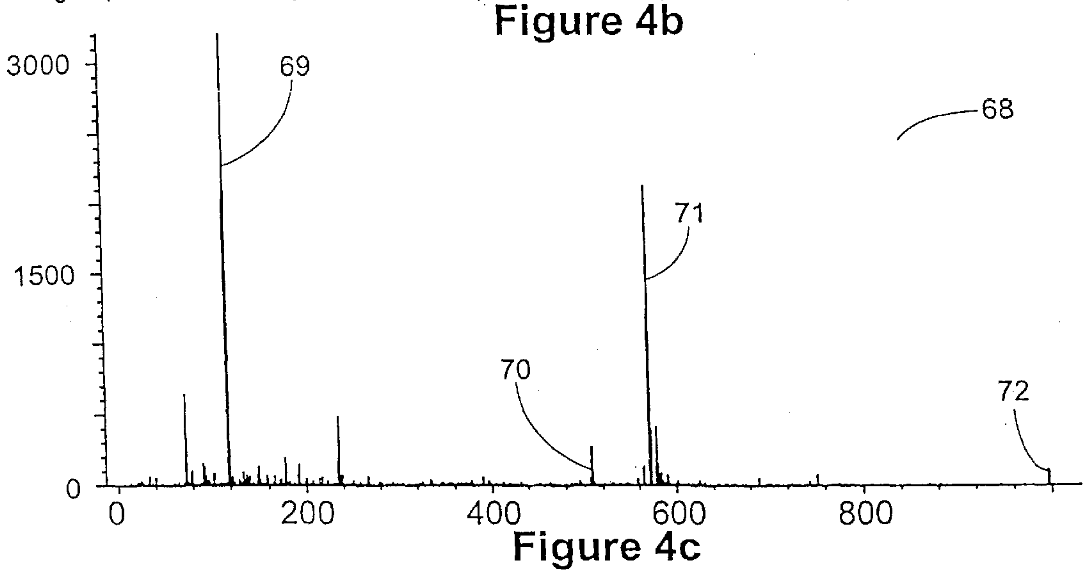
FIG. 4*c* is a mass spectrum of a sample solution Electrosprayed from tip one and a calibration solution Electrosprayed from tip two simultaneously from a dual tip off axis probe.

An Electrospray probe assembly, similar to ES probe assembly 2, configured with two ES tips oriented to spray approximately in a parallel direction as diagrammed FIGS. 1 and 3, was used during acquisition of the mass spectra shown in FIGS. 4*a* through 4*c*. Electrospray ion source 1 was interfaced to a quadrupole mass spectrometer for the data acquired in FIGS. 4*a* through 4*c*. FIG. 4*a* shows mass spectrum 60 acquired from a 10 ng/ul gramicidin S, in a 1:1 methanol:water sample solution, continuously infused through delivery line 9. The solution containing the gramicidin S sample was Electrosprayed with pneumatic nebulization assist from ES tip 3 at a liquid flow rate of 50 ul/min. The doubly charge peak 61 of Gramicidin S is the dominant peak in the spectrum with a relative abundance of 3,100 as shown by ordinate 62. The orientation of the axis of ES probe tips 3 and 4 was approximately 60 degrees angled up from the horizontal (z-x) plane which intersects ES source centerline 24. For the data acquired in FIG. 4 $\theta_2$=60 degrees where $\theta_2$ is the angle formed by the ES probe tip axis relative to the z axis and is axially symmetric around the z axis. The axis of ES tips 3 and 4 were positioned approximately parallel and each tip was positioned an equal distance from the z-x plane during spraying. ES tips 3 and 4 were separated by fixed distance of approximately 8 mm during acquisition of mass spectra 60, 64 and 68. ES tips 3 and 4 were positioned approximately 1.5 cm along the z axis and up approximately 1.0 cm along the y axis as shown by dimensions Z and r respectively in FIG. 3. The position of ES tips 3 and 4 along the x axis was adjusted to optimize performance after which the dual ES tip positions were locked in position during acquisition of the mass spectra series shown in FIGS. 4*a* through 4*c*. A mixture of calibration compounds valine (50 ng/ul), tri-tyrosine (25 ng/ul) and hexa-tyrosine (50 ng/ul) in a 79% water, 19% iso-propanol and 2% propionic acid solution was delivered to ES probe tip 4 at a flow rate of 500 ul/min. The calibration solution was Electrosprayed from probe tip 4 with pneumatic nebulization assist. Mass spectra 64 acquired while Electrospraying the calibration solution from ES probe tip 4 is shown in FIG. 4*b*. Peaks 65, 66 and 67 with mass to charge values of 118, 508 and 998 respectively were formed from the singly charged protonated molecular ions of the calibration components of known molecular weight. Other peaks present were from contamination compounds present in solution. The abundance of peak 65 (118 m/z) is approximately 4,300. Mass spectrum 68 in FIG. 4*c* was acquired while simultaneously spraying sample and calibration solutions from ES tips 3 (50 ul/min) and 4 (500 ul/min) respectively. Sample or gramicidin S peak 71 abundance of approximately 2,600 has been reduced by less than 15% when compared to the gramicidin S peak 61 acquired when independently sprayed. The calibration peak heights have changed less than 15% comparing mass spectra 64 and 68 acquired with single and simultaneous solution spraying.

The nebulization gas flow and the calibration solution flow through ES tip 4 was turned off during the acquisition of mass spectrum 60 shown in FIG. 4*a*. Conversely, the nebulization gas flow and the sample solution flow through ES tip 3 was turned off during the acquisition of mass spectrum 64 shown in FIG. 4*b*. Both calibration and sample solution flows and nebulization gas flows to ES tips 3 and 4 were turned on during acquisition of mass spectrum 68 shown in FIG. 4*c*. Ions formed from the two independent simultaneous Electrosprays mixed in the gas phase prior mass analysis allowing acquisition of a mass spectrum with an internal standard. A quadrupole mass analyzer was used to acquire the data shown in FIGS. 4*a* through 4*c*. Alternatively, other types of mass analyzers could be used such as Time-Of-Flight, three dimensional quadrupole ion traps, magnetic sector, Fourier Transform Mass Spectrometers and triple quadrupoles. Internal standards within a mass spectrum can be used to improve the accuracy of mass to charge assignments of sample peaks, particularly for mass spectra acquired with higher resolution. The sequence of mass spectra shown in FIGS. 4*a* through 4*c* can be acquired in under one minute limited only by the mass spectrum accumulation time and the speed with which individual liquid flow rates can be turned on or off. The invention allows the efficient mixing of gas phase ions produced from multiple solutions Electrosprayed simultaneously over a wide range of liquid flow rates. Sample and calibration solutions can be introduced through multiple ES probe tips with no need to adjust probe tip position after initial optimization. The invention increases the versatility of an analytical mass analysis system that can accept multiple solution inputs with unattended operation. An Electrospray ion source comprising multiple inlet probes, configured for independent or simultaneous spraying, minimizes system downtime, maximizes sample throughput, allows selective acquisition of mass spectra with internal standards without contaminating sample solutions. As will be described below, a multiple inlet probe API source an also be used to study ion-ion gas phase interactions at atmospheric pressure.

In the example shown in FIGS. 4*a* through 4*c*, the solution flow to ES tips 3 and 4 was supplied through delivery lines 9 and 10 respectively by liquid pumps which could be turned on or off independently with or without nebulization gas flow. Alternatively, solution 44 can be supplied to ES tip 7 from solution reservoir 45 as shown in FIG. 2. Solution 45 is drawn to ES tip 7 through delivery line 15 by the venturi force induced from the nebulization gas supplied to ES tip 7 through line gas delivery line 13. With solution reservoir 45 positioned below ES probe tip 7, solution flow to ES tip 7 stops when the nebulization gas is turned off. If no nebulization assist is used when Electrospraying from ES tip 7, a gas pressure head can be applied to solution 45 in reservoir 44 to aid in initially forcing liquid to ES tip 7. The electrostatic forces from the electric field applied during unassisted Electrospraying can also maintain solution flow through ES tip 7. Liquid flow to ES tip 78 can then be turned off by removing the gas pressure head on solution 45 in reservoir 45 and reducing the electric field at ES tip 7. Unassisted Electrospray can be turned on or off by applying the appropriate relative potentials to an individual ES tip and then removing the potential from the tip. For example if two independent ES probes are configured in an ES source and 6,000 volts is applied to each probe independently during ES operation then the spraying from a given probe can be switched on or off by applying kilovolt potentials to the ES probe or lowing the probe voltage to stop the Electrospray. Each ES tip 3, 4, 5 and 7 can be individually configured to optimize performance for a specific set of applications with a range of liquid flow rates and solution chemistries. ES tips can be configured with single, double and triple tube layers to accommodate various gas and liquid layers at the ES tip connected to specific solution and gas delivery lines. Single layer tips such as replaceable microtips which allow low ES flow rates may be pre-loaded prior to installation in an ES source and do not require solution delivery lines. Multiple microtips can be configured to spray simultaneously if is desirable to acquire mass spectra with an internal standard while Electrospraying at liquid flow rates in the 25 to 500 nanoliter per second range. For higher liquid flow rates, layered ES tip configurations are typically used.

Figure 12:
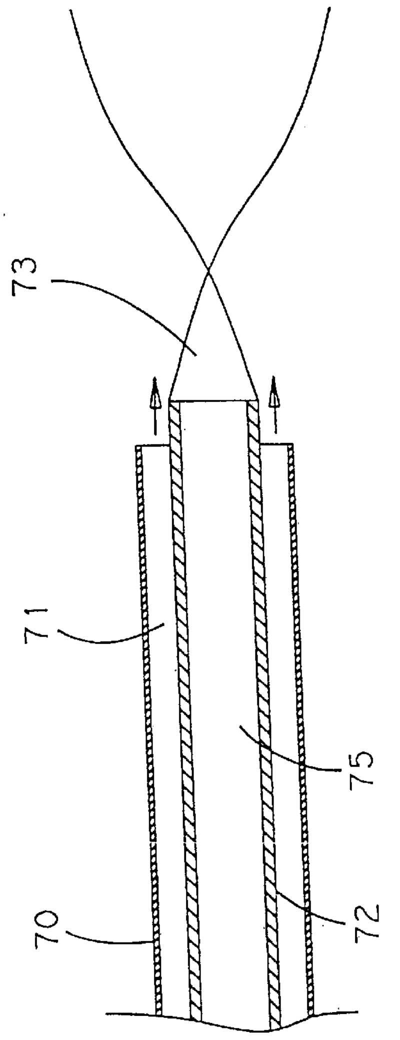
FIG. 12 is a cross section diagram of a two layer Electrospray probe tip.

FIG. 12 is a diagram of a two layer Electrospray tip. With a two layered ES tip configuration, nebulization gas 74 can be supplied through annulus 71 between a second layer tube 70 surrounding liquid sample introduction tube 72 to assist the in the formation of charged liquid droplets during Electrospray operation. Sample bearing solution is delivered to exit end 73 of inner tube 72 through bore 75. A second liquid layer can be delivered through annulus 71 replacing the gas flow if liquid layering is desired during operation at the ES probe tip. Alternatively, ES probe tips may be configured with three concentric layers as diagrammed in FIG. 13. Typically with a three layer ES probe, sample solution is introduced through bore 88 of inner tube 80, a second solution can be introduced through annulus 84 between tubes 80 and 81 and, if required, a gas flow 85 can be delivered through annulus 83 between tubes 81 and 82. The solutions delivered through bore 88 and annulus 84 mix at the first layer tube exit 86 in region 87 during ES operation. The second solution delivered through annulus 84 may contain known calibration compounds which mix with the sample solution delivered through bore 88 in region 87 during ES operation. Conventionally, calibration compounds are mixed with sample bearing solution prior to the solution being delivered through bore 88.

Figure 13:
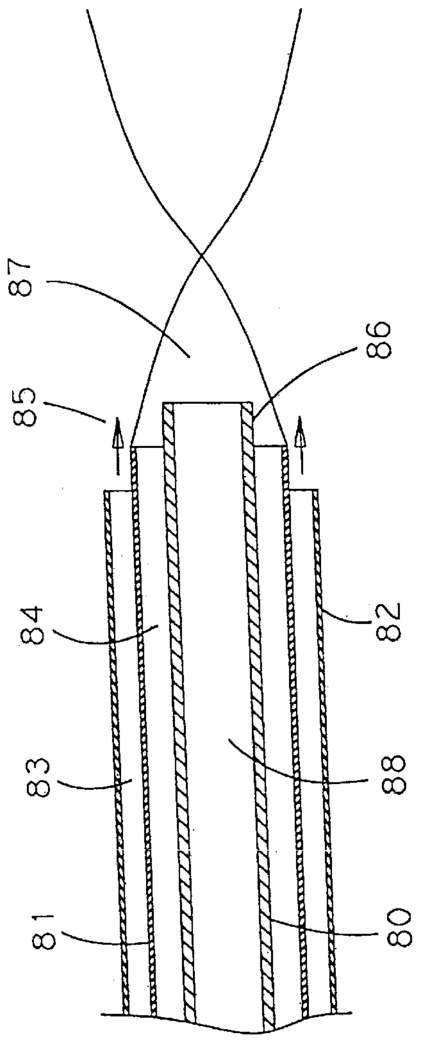
FIG. 13 is a cross section diagram of a three layer Electrospray tip.

One ES probe tip or combinations of ES probe tips 3, 4, 6 and 7 can be configured as two or three layer assemblies similar to that shown in FIGS. 12 and 13. Depending on the analytical application, solution introduction tube 72 or 80 can be configured as a Capillary Electrophoresis column, a microbore packed capillary column, or an open bore tube of either dielectric or conductive material. Single, two and three layer ES probe tips which are configured in off-axis positions or positioned near the API source centerline are commercially available. An off-axis probe position is typically used for higher liquid flow rate applications in Electrospray ion sources. The present invention embodies the configuration of multiple ES probes with single, double or triple layer tips in an API source with the ability to conduct individual or simultaneous spraying of solution from two or more probe tips with or without nebulization assist. Multiple probe tip positions can be fixed during API operation allowing sequential or simultaneous spraying from multiple tips without the need to adjust probe location and allowing rapid, efficient and unattended switching of solution spraying from variety of inlet probes.

Figure 5:
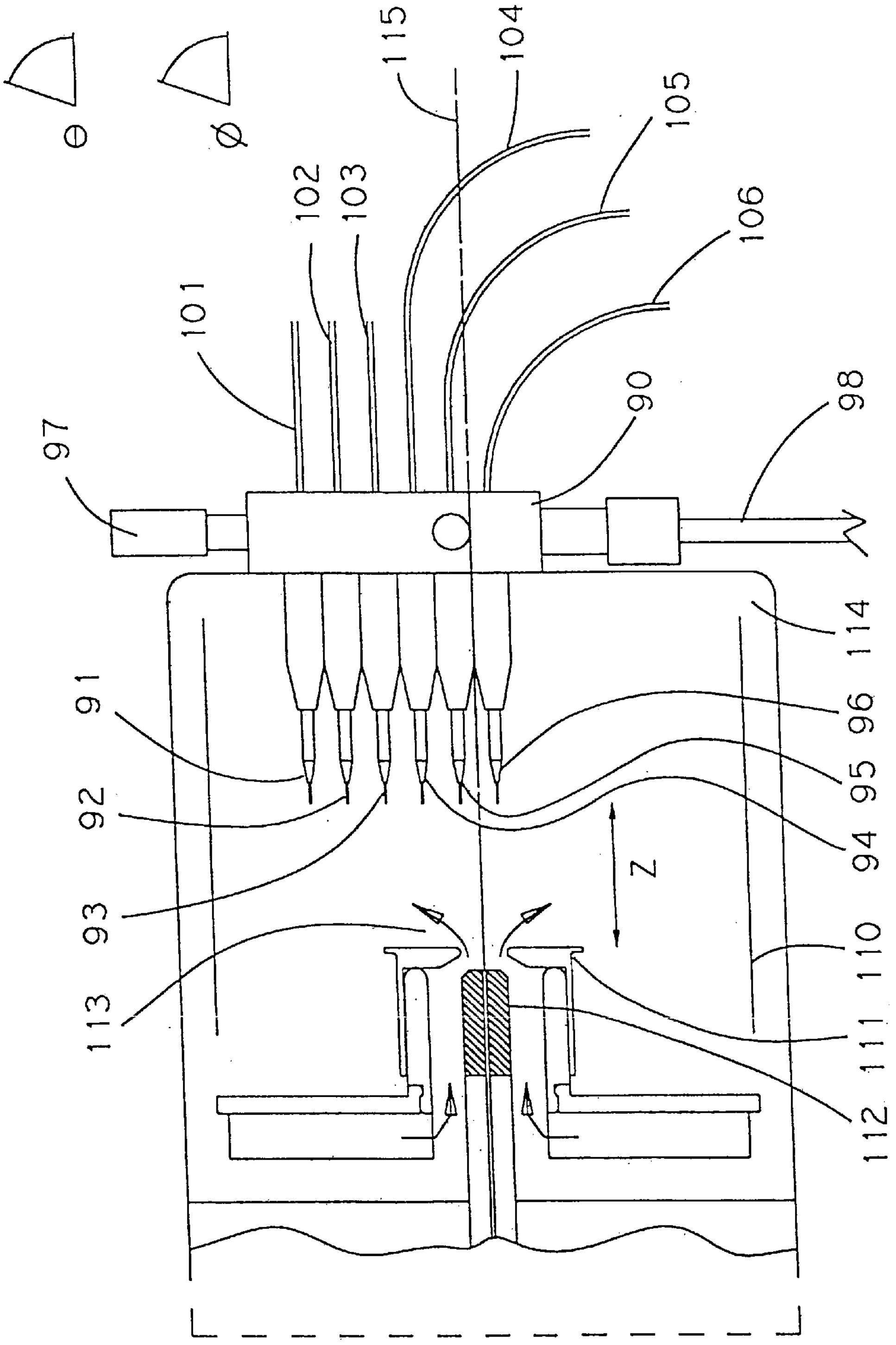
FIG. 5 is a diagram of a six tip ES probe array with pneumatic nebulization assist mounted near the axis to the ES source chamber centerline.

FIG. 5 shows an alternative embodiment of the invention. Electrospray source 114 is configured with ES probe assembly 90 comprised of six ES tips 91 through 96 with individual liquid supply lines 101 through 106 respectively. Position adjuster 97 can be used to move ES probe assembly 90 such that any ES tip can be located near ES source centerline 115. Gas line 98 supplies nebulization gas to ES probe tips 91 through 96. Alternatively, ES probe assembly 90 can be configured such that each ES tip 91 through 96 is configured with an individual nebulization gas supply each of which can be independently turned on and off. In the embodiment diagrammed in FIG. 5 ES tips 95 and 92 can be supplied with individual calibration solutions while separate sample solutions are supplied to ES tips 91, 93, 94 and 96. With this arrangement, mass spectra acquired from the Electrospraying of any sample solution can have internal standard peaks added by turning on the nearest adjacent ES tip supplied with calibration solution. In the embodiment shown in FIG. 5, several sample solutions can be rapidly analyzed with little or no cross contamination which can occur when multiple samples are delivered to the ES source sequentially through the same ES probe tip. After acquiring MS data from a sample solution spraying from ES tip 96 simultaneously with a calibration solution spraying from ES probe tip 95, ES probe assembly 98 can be translated using adjuster 97 such that ES tip 94 is positioned near ES source centerline 115. ES tip 95 can be used to spray calibration solution simultaneously with the Electrospraying of a sample solution from ES tip 94 to provide internal standard peaks in the acquired sample solution mass spectrum. Further ES probe assembly translation can be used to position ES tip 92 near ES source centerline 115 to selectively spray calibration solution during sample solution Electrospraying from either tips 91 or 93. The linear ES tip configuration of ES probe 90 can be extrapolated into a two dimensional array of tips with automatic x and y position translators. Also, flow-through ES tips can be replaced by pre-loaded microtips. Alternatively, all tips of ES probe assembly 90 can be used to spray sample solutions and a single off axis ES probe can used to Electrospray calibration solution when it is desirable acquire a external standard calibration mass spectrum or to add an internal standard to the acquired sample solution mass spectra. Kilovolt potentials can be applied to ES source elements 110, 111 and 112 to initiate Electrospray with ES probe assembly 90 operated at ground potential. Alternatively, kilovolt electrical potentials can be applied to ES probe tips 91 through 96 during Electrospray operation. ES source 114 can be configured with heated counter current drying gas to aid in the evaporation of the Electrospray produced charged droplets sprayed sequentially or simultaneously from one, two or more ES tips.

Figure 6:
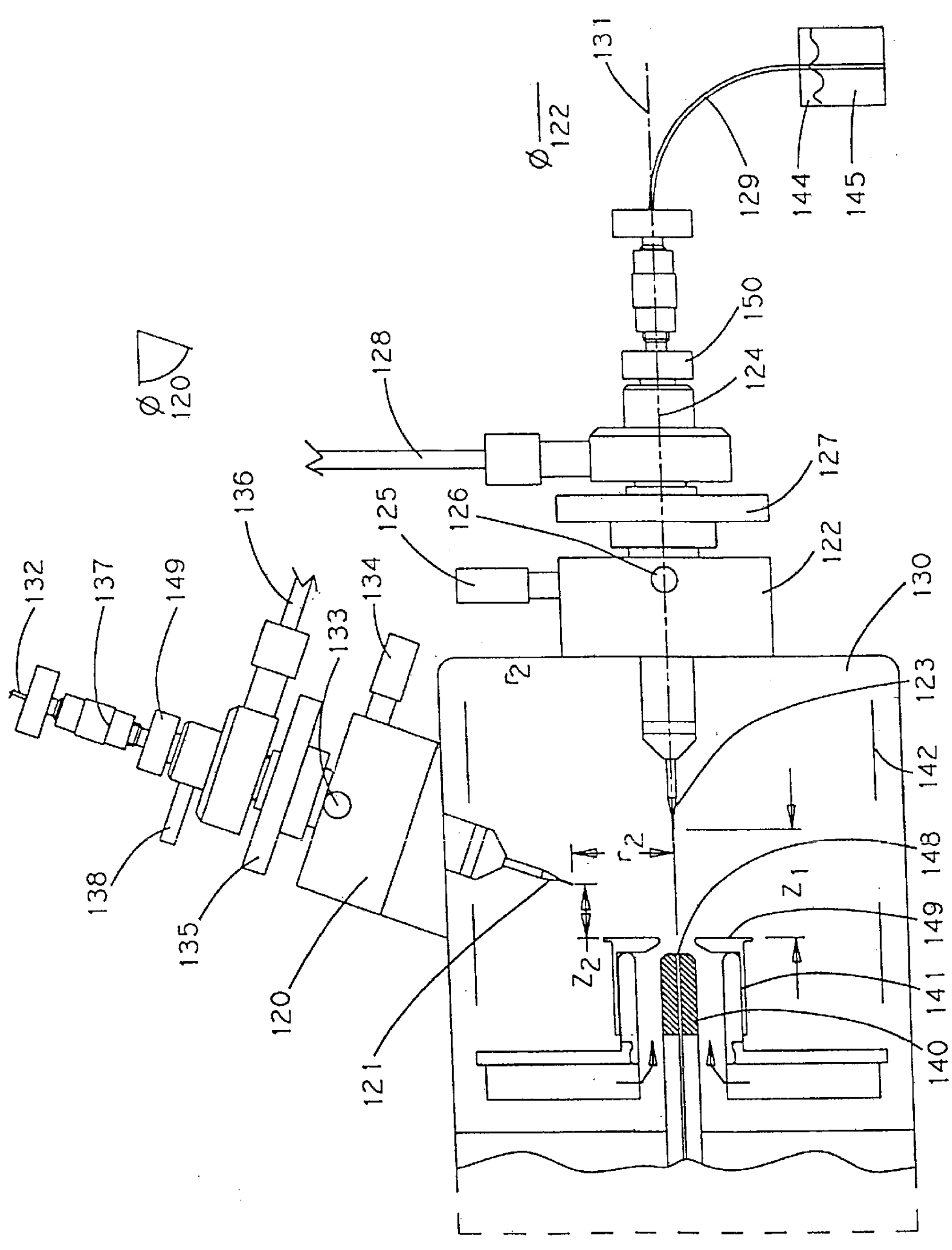
FIG. 6 is a cross section diagram of two ES probe assemblies with independent x-y-z tip position adjustment configured in an ES source.

The ES probe tip positions can either be fixed with respect to each other and the ES source capillary entrance or the tip positions can be adjustable. As is shown in FIG. 1, ES tip positions 3 and 4 are fixed relative to each other but, as a set, movable in the x direction and rotationally around the ES probe 2 mounting block rotational axis. An alternative to the invention is shown in FIG. 6 where ES probe assemblies 120 and 122 include full x, y and z position adjustments for ES tips 121 and 123 respectively. ES probe assembly 122 is positioned parallel to ES source 130 centerline 131. The angle of ES probe tip 123 axis 124 relative to ES source centerline 130 is equal to zero degrees, $\phi_1=0°$. Sample bearing solution can be introduced into liquid delivery tube 129 of ES probe assembly 122 or into entrance tube 132 of ES probe assembly 120 with independent liquid delivery systems. In this manner, different samples or mixture of samples and/or solvents can be sprayed simultaneously or individually. Liquid delivery systems may include but are not limited to, liquid pumps with or without auto injectors, separation systems such as liquid chromatography or capillary electrophoresis, syringe pumps, pressure vessels, gravity feed vessels or solution reservoirs. During ES source operation, the spray produced from each ES probe can be initiated by turning on the liquid flow using a solution delivery system. With the appropriate solution reservoir configuration, pneumatic nebulization gas flow can also be used to initiate Electrospray. When nebulization assist is not used, the Electrospray from either ES tip 121 or 123 can be turned on by increasing the voltage applied to an ES tip relative to the voltage applied to ES source electrodes 140, 141 and 142. For example, if the voltages applied to capillary entrance electrode 140, endplate and nosepiece 141 and cylindrical electrode 142 are set at −500, 0 and +500 V respectively, the Electrospray from ES tip 121 can be initiated by increasing the voltage applied to ES tip 121 to +5,000 V. The Electrospray from ES tip 121 can be stopped by setting the potential applied to ES tip 121 to 0 V. Electrospray from ES tip 123 would remain off with an appropriate voltage (approximately 0V) applied to ES tip 123 such that the electric field at ES tip 123 is effectively neutral. Electrospray from ES tip 123 can be turned on by applying +5,000 V to ES tip 123. Nebulization gas supplied to ES tips 121 and 123 through gas delivery lines 136 and 128 respectively can be turned on when kilovolt potentials are applied to the ES tips to aid in the Electrospray charged droplet formation process. The nebulization gas flow to an individual ES tip can be turned off when the appropriate voltage is applied to the ES tip to shut off the Electrospray. Switching, voltage and nebulization gas would allow rapid turning on and off of the Electrospray at an ES tip even if the sample bearing solution continued to flow through the tip for a period of time. Alternatively, as was shown in FIG. 2 where a reservoir is used as a solution source, the liquid flow to ES probe tip 123 or 121 can be controlled by turning the nebulization gas flow on or off. When the nebulization gas flow is turned on, the venturi effect at the ES probe tip pulls solution from the reservoir to the ES probe tip where it is nebulized. In the case where Electrospray is sustained by supplying pneumatic nebulization gas flow to the ES probe, a simple and inexpensive solvent delivery system can be employed.

ES probe assembly 120 axis 137 shown in FIG. 6 is positioned at an angle of 70 degrees, $\phi_{120}=70°$, from ES source centerline 131. ES probe assembly 120 is configured with three layer ES probe tip 121 having sample solution inlet 132, layered flow solution inlet 138 and nebulization gas inlet 136. A diagram cross section of ES probe tip 121 is shown in FIG. 13. Liquid sample enters bore 88 of first layer tube 80 through transfer line 132. A second solution can be added through transfer line 138 into annulus 84 between tubes 80 and 81 and this solution forms a sheath liquid surrounding and mixing with the sample solution at exit end 86 in region 87. Nebulizer or corona suppression gas can be introduced to ES probe tip 121 through gas delivery or transfer line 136 into annulus 83 between tubes 81 and 82. Liquid layering of solutions in region 87 at the tip of three layer ES probes has been used to interface LC, CE or CEC separation systems to ES sources. When interfacing to CE, CEC or microbore LC columns, sample introduction tube 80 may actually be the CE, CEC or LC column itself. The second layer solution flow may also be used to add a calibration compounds to the sample solution exiting from tube 86 of ES probe tip 121. The resulting mass spectrum acquired from such a mixed solution spray would contain an internal standard. The calibration solution could be started or stopped by turning on or off the liquid delivery system supplying solution through transfer line 138. The introduction of a calibration solution in this manner avoids contaminating the original sample solution source but still necessitates mixing of solutions in region 87 prior to spraying. The calibration components in the resulting mixture may effect the Electrospray ionization efficiency of the sample compounds present thus causing peak height distortion in the acquired mass spectrum. The relative positioning of the exit ends of tubes 80 and 81 can effect the relative intensity of ion populations layered from the two solutions produced in the Electrospraying process. The layered liquid flow can also be used to introduce a different solvent system to study ion-neutral interactions in a multiple probe spray mixture. A range of solution compositions can combined in the liquid phase using the three layer probe tip assembly shown in FIG. 13 if required in an analytical application. A four layer variation of the three layer probe shown in FIG. 13 can be operated such that no liquid mixing occurs by separating the liquid solution layers with nebulizer or corona suppression gas. For example, a four layer probe tip embodiment can have liquid solution delivered through the innermost tube one, nebulizer gas supplied through the annulus between tubes one and two, a second liquid solution delivered through the annulus between tubes two and three and a nebulizer gas supplied through the annulus between tubes 3 and 4. Alternatively, gas can be supplied through the innermost tube one with a liquid, gas and liquid layering. Three or more liquid solutions can be layered where some of the solutions delivered through separate layers are mixed in the liquid state as they emerge from the layered tip similar to the solution mixing shown in FIG. 13. Layered liquid flow allows the introduction of additional solutions through one or more Electrospray probes, and can serve as a means of interfacing ES with one or more separation systems such as CE, CEC and LC.

ES probe tip 123 is configured as a two layer probe, shown in FIG. 12, with calibration solution 145 supplied from reservoir 144. With little or no pressure head or gravity feed applied, calibration solution 145 can be pulled from reservoir 144 using the venturi suction effect of the nebulizing gas applied at ES probe tip 123. Calibration solution 144 can be sprayed from ES tip 123 when nebulization gas flow is applied through gas delivery tube 128. Solution delivery tube 139 can be initially filled with solution by applying head pressure to reservoir 144, by gravity feed from reservoir 144 or by turning on the nebulizing gas ES probe tip 123. Once solution delivery tube 129 and the inner tube of ES tip 123 are filled with calibration solution, any head pressure in the attached reservoir is relieved and, with no gravity feed applied, the liquid flow through solution delivery tube 129 can be started and stopped by turning the nebulizing gas flow to ES tip 123 on and off. Calibration solution can be selectively sprayed from ES probe tip 123 individually or simultaneously with a sample solution Electrosprayed from ES probe tip 121. Alternatively, solution can be delivered to ES probe tip 123 using a syringe pump, liquid chromatography system or other liquid delivery system. Solution flow to ES probe tip 123 can then be turned on or off by turning the solvent delivery system flow on or off.

The x-y-z and angular positions of ES probe tips 121 and 123 relative ES source axis 131 and capillary entrance 148 as shown in FIG. 6 may be adjusted to optimize ES performance while spraying from single ES probes individually or from two ES probes simultaneously. The rotational position of ES tip 121 around ES probe assembly axis 137 is adjusted with positioning knobs 133 and 134. The position of ES tip 121 along the axis of ES tip 121 is adjusted by turning knob 135. Similarly, the rotational and axial position of ES tip 123 is adjusted with positioning knobs 125, 126 and 127 respectively. ES probe tip positions may require adjustment to optimize ES performance for given liquid flow rates and solution or sample types. Once optimized for individual or simultaneous spraying, the probe positions can remain fixed during ES operation. For the embodiments shown in FIGS. 1 and 6, a portion of each ES probe assembly is located outside the ES source chamber housing. This allows full adjustment of x-y-z and angular position while operating the ES source to achieve optimal performance. ES probe assemblies 120 and 122 as diagrammed in FIG. 6 also allow adjustment of the relative layered tube exit tip positions. For example, adjustment of nut 149 will move the inner tube 80 exit 86 position, as shown in FIG. 13, along the axis of ES probe tip 121 relative to the second and third layer tube exit positions. The relative position of innermost tube exit end 73 as shown in FIG. 12 can be adjusted using nut 150 for optimizing the nebulizing gas performance at ES tip 123. These ES tip adjustments allow for optimization of layered liquid flow and/or gas nebulization tube tip positions while operating the ES source. Different liquid flow rates can be delivered through ES probe tips 121 and 123 during simultaneous Electrospraying from both ES probe tips. The solution flow rate range used for ES applications extends from below 25 nanoliters per minute to over 2 milliliters per minute. For a 25 to 1,000 nanoliters per minute range of liquid flow rates, a single layer flow through or replaceable micro Electrospray probe tip can be configured to replace two layer ES probe tip 123 in ES source 130. Unassisted Electrospray operation can be conducted from ES probe tips individually or simultaneously with pneumatically assisted ES probes. Two or more pneumatic nebulization assisted ES probes configured with full tip position adjustment can be operated simultaneously in one ES chamber. Combinations of single, two layer and three layer ES probes can also be configured and operated simultaneously in a single ES chamber.

ES source 130, as diagrammed in FIG. 6, is configured with two ES probes with independent adjustable ES tip positions. Axis 124 of ES probe assembly 122 is positioned along ES source centerline 131 with ES probe tip 123 spaced a distance $Z_1$ along ES source centerline 131 from endplate nosepiece face 149. Axis 137 of ES probe assembly 120 is positioned at an angle of $\phi_{120}$=70 degrees relative to ES source centerline 131. Tip 121 of ES probe assembly 120 is shown located a distance $Z_2$ axially from end plate nosepiece face 149 and a distance $r_2$ radially from ES source centerline 131 with a radial angle $\theta_{120}$=0 degrees. Angle $\theta_i$ is defined as the radial angle around centerline 131 looking in the direction that the gas flows through the capillary or the positive z axis direction as shown in FIG. 1. The 12 o'clock position above centerline 131 is defined as 0 degrees with the angle increasing clockwise to 360 degrees. Setting $Z_1$=2 cm, $Z_2$=1.5 cm and $r_2$=1.5 cm, higher liquid flow rates can be introduced through ES probe tip 121 and lower liquid flow rates, with a solution containing calibration compounds, can be introduced through ES probe tip 123. Both ES probe tips 121 and 123 can be operated with pneumatic nebulization assist, for the tip positions and angles given. When higher liquid flow rates are sprayed from ES probe tip 123 the probe tip axis angle, $\phi_{122}$, relative to ES source centerline 131 can be increased by turning adjustment knobs 125 and/or 126. Alternatively ES probe assembly 122 can be positioned off ES source centerline 131 but spraying approximately in a direction parallel to centerline 131. Depending on the specific analytical problem requiring ES MS analysis or ES MS/MS$^n$ analysis, multiple ES probes can be positioned in the ES source to optimize performance for individual or simultaneous spraying operation.

Figure 7A:
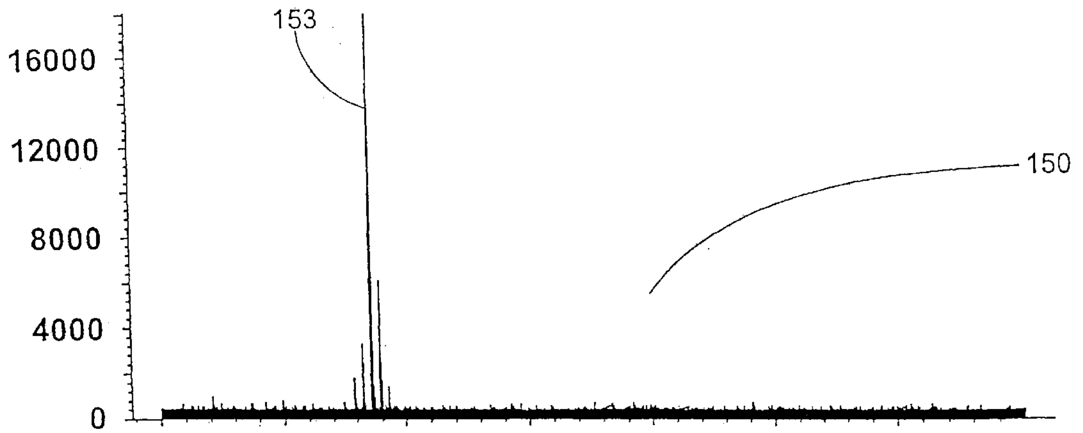
FIG. 7*a* is a mass spectrum of a sample solution containing Leucine Enkephalin Electrosprayed with pneumatic nebulization assist through an off-axis ES probe assembly into the ES chamber.
Figure 7B:
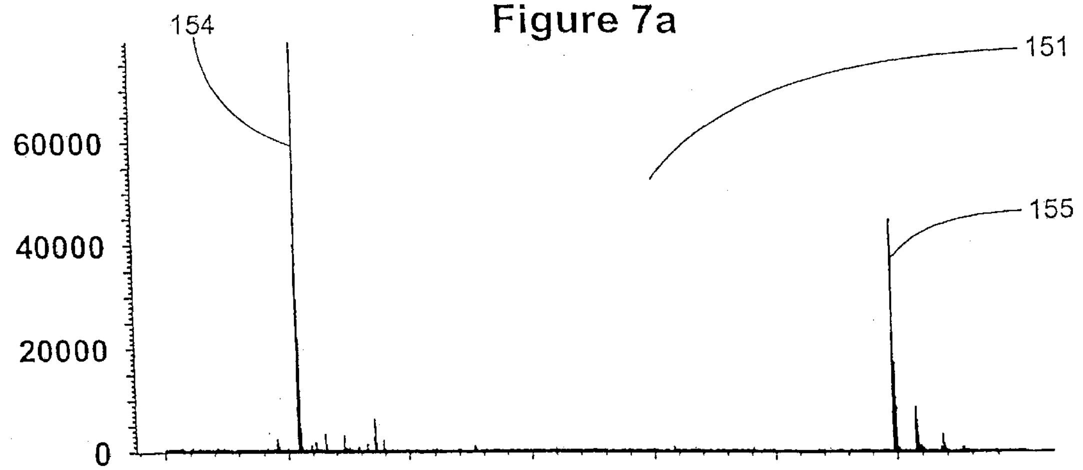
FIG. 7*b* is a mass spectrum of a calibration solution containing Tri-Tyrosine and Hexa-Tyrosine Electrosprayed with pneumatic nebulization assist from a second ES probe positioned near the ES source centerline.
Figure 7C:
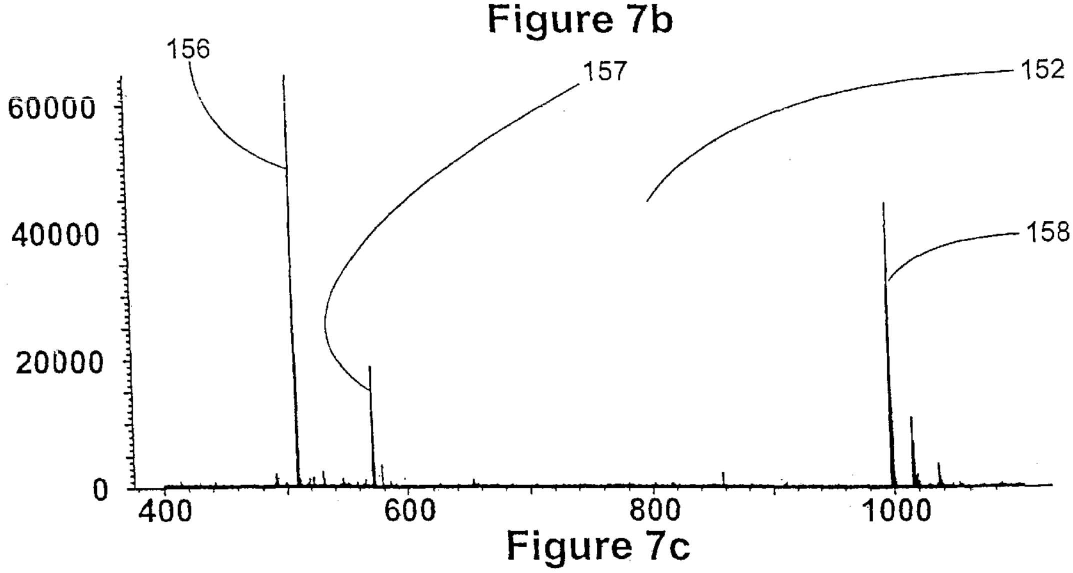
FIG. 7*c* is a mass spectrum of the sample and calibration solutions Electrosprayed simultaneously into the ES chamber from an off-axis ES probe and an ES probe positioned near the ES source centerline respectively.

Mass spectra acquired from a dual probe ES source configured similar to that shown in FIG. 6 are shown in FIGS. 7*a* through 7*c*. FIG. 7*a* shows a mass spectrum of a sample solution of 1:1 methanol:water containing Leucine Enkephalin Electrosprayed with pneumatic nebulization assist at a liquid flow rate of 100 ul/min from ES probe tip 123 in dual probe ES source 130. Protonated m/z peak 153 of Leucine Enkephalin is the dominate peak in acquired mass spectrum 150. No solution was flowing through off axis probe ES probe tip 121 during acquisition of mass spectrum 150 shown in FIG. 7*a*. Mass spectrum 151 shown in FIG. 7*b* was acquired while a Electrospraying, with pneumatic nebulization assist, a calibration solution from ES probe tip 121 configured in dual probe ES source 130. The calibration solution contained containing known molecular weight compounds Tri-Tyrosine (50 pmol/ul) and Hexa-Tyrosine (50 pmol/ul) in an 80:20 solution of water:isopropanol with 2% propionic acid delivered from a sample reservoir at a flow rate of 5 ul/min. Calibration solution flow was driven primarily by the venturi force of the pneumatic nebulization gas flow at ES tip 121. Protonated molecular ions of Tri-Tyrosine 154 and Hexa-Tyrosine 155 are the primary peaks in mass spectrum 151. No solution was flowing through the ES probe tip 123 during acquisition of calibration spectrum 151 shown in FIG. 7*b*. FIG. 7*c* shows mass spectrum 152 acquired while simultaneously spraying calibration and sample solutions from ES probe tips 121 and 123 respectively. Protonated molecular ion peaks 156 and 158 resulting from Electrospraying of the calibration solution can be used as an internal standard to improve the accuracy of the calculated mass assignment of the sample Leucine Enkephalin peak 157 or another unknown compound molecular weight. As was shown in FIGS. 4*a* through 4*c*, little signal loss is observed when comparing single and dual probe spraying. ES probe tip 121 and 123 positions were not changed during acquisition of the mass spectra 150, 151 and 152 shown in FIG. 7.

It is obvious to one skilled in the art that any number of combinations of multiple Electrospray probe tip positions may be configured in an Atmospheric Pressure Ion Source where:

1. the Electrospray tip angles ($\phi_1$, $\phi_2$, . . . $\phi_N$) can range from $\phi_i$=0° to 180°,
2. the Electrospray tip locations ($r_1$, $\theta_1$, $z_1$,), ($r_2$, $\theta_2$, $z_2$), . . . ($r_N$, $\theta_N$, $z_N$) can have values where $r_i$ may equal any distance within the ES chamber, $\theta_i$=0° to 360° measured clockwise, and $z_i$ may equal any distance within the ES chamber, and
3. the relative Electrospray tip radial angle of separation ($\theta_1-\theta_2$), . . . ($\theta_1-\theta_N$) for any two ES probe tips i and k can range from $\theta_i-\theta_k$=0° to 360°, Electrospray probe assemblies may be configured with two or more parallel tips or with individual tips. ES probe tip positions may be adjustable or fixed in the ES chamber. Although FIGS. 1 and 6 show Electrospray sources configured with one off axis ES probe assembly, several off axis ES probe assemblies with different angles $\theta_l$ can be configured into an ES source chamber which may also include an ES probe assembly located near the ES source centerline. In addition, individual Electrospray probe tips may be configured with but not limited to any of the following ES tip types: a single layer Electrospray probe tip, a replaceable micro Electrospray tip, a flow through micro Electrospray tip, a pneumatic nebulization assisted Electrospray tip with or without liquid layer flow, an ultrasonic nebulizer assisted Electrospray tip or a heated Electrospray tip. Any combination of ES probe tip types can be configured into an ES source and operated individually or simultaneously. ES probes can be configured to extend through the wall of the ES chamber or be mounted entirely within the ES chamber.

Figure 8:
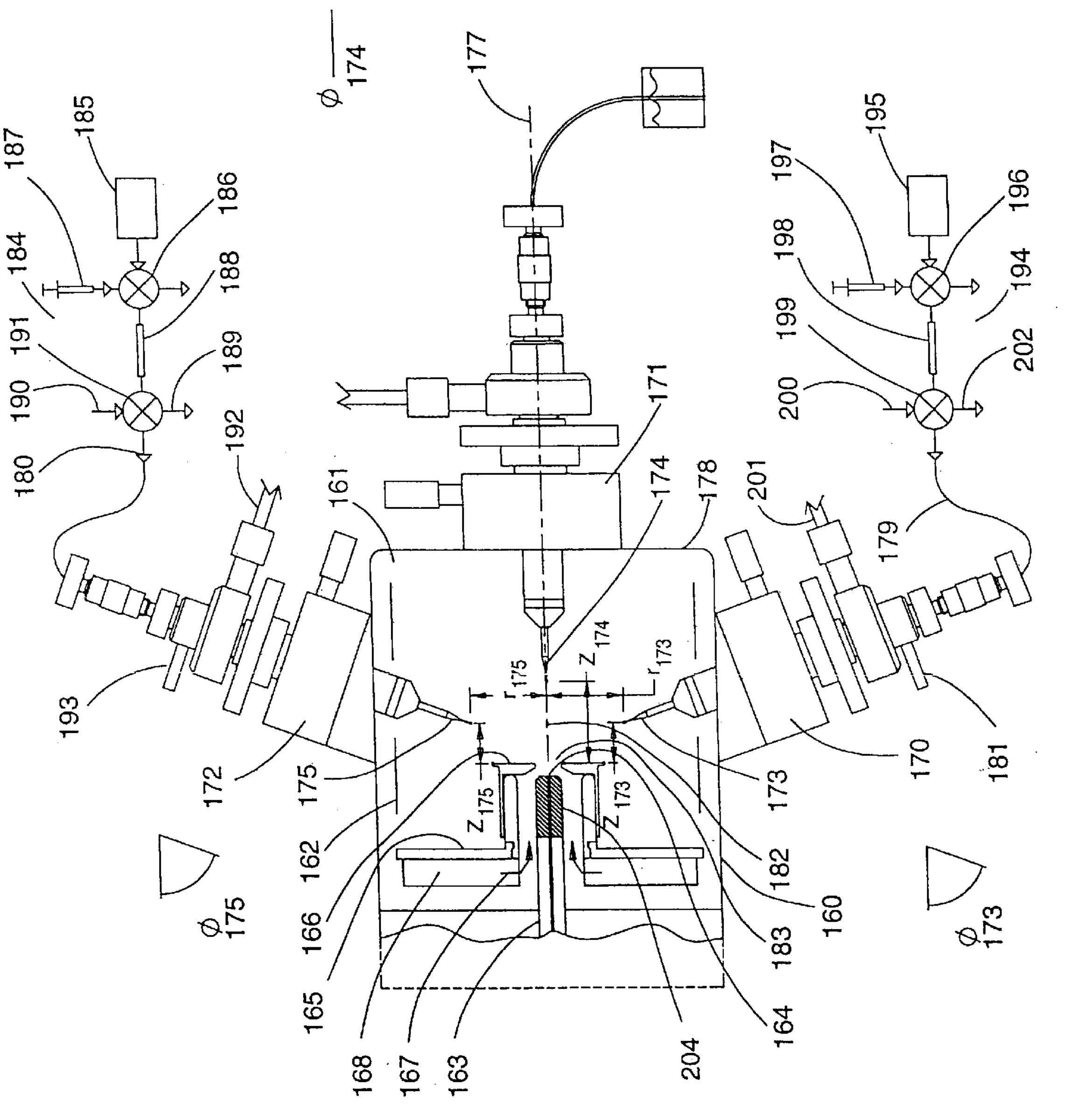
FIG. 8 is a diagram of an Electrospray source configured with three independent Electrospray probes with two off-axis ES probes connected to two LC separation systems.

FIG. 8 is a diagram of an alternative embodiment of the invention where three ES probes are configured within ES source 160. Electrospray source 160 includes cylindrical electrode 162 dielectric capillary 163, counter current drying gas 167, gas heater 168, endplate electrode 165 and attached endplate nosepiece 166. Alternatively, a non dielectric capillary, a heated capillary, a flat plate orifice or a nozzle can be configured as an orifice into vacuum replacing dielectric capillary 163. Multiple ES source probes can be configured with different arrangements of drying gas flow direction relative to the ES source axis and the axis of the orifice into vacuum such as those arrangements used with "z spray" or "pepperpot" Electrospray source geometries. ES probe assemblies 170, 171 and 172 are mounted in ES source chamber 161 each with x-y-z and angular position adjustment of ES probe tips 173, 174 and 175 respectively as was previously described for the ES probe assemblies 120 and 122 in FIG. 6. In the embodiment shown in FIG. 8, the x-y-z and angular position of ES probe tips 173, 174 and 175 can be adjusted during tuning of Electrospray source performance. Each ES probe tip position can be adjusted to optimize ES-MS or ES-MS/$MS^n$ performance during single or simultaneous multiple probe operation for a wide range of combinations of liquid flow rates and solution compositions.

Once the positions of ES probe tips 173, 174 and 175 are optimized during ES-MS operation tuning, no further adjustment is required during ES source operation and MS data acquisition. ES probe assemblies 170 and 172 are each configured with three layer ES probe tips 173 and 175 respectively as is shown in FIG. 13. ES probe assembly 171 is configured with two layer ES tip 174 as is shown in FIG. 12. Solution can be Electrosprayed from ES probe assemblies 173 and 175 with or without pneumatic nebulization assist and/or liquid layer flow. The positions of ES tips 173, 174 and 175 are, $Z_{173}$, $R_{173}$, $Z_{175}$, $R_{175}$ and $Z_{174}$ respectively with ES tips 173 and 175 set spray angles of $\theta_{173}$ and $\theta_{175}$, and radial angles $\theta_{173}$ and $\theta_{175}$, respectively. As examples shown in FIG. 8, ES probe tip 173 is set at an angle of +60 degrees ($\phi_{173}$=+60°) and ES probe tip 175 is set at an angle of −60 degrees ($\phi_{175}$=−60° or +300 degrees) relative to ES source centerline 177. The included angle, ($\phi_{173}-\phi_{175}$), between ES probe tips 173 and 175 in the embodiment shown is 120 degrees, however, this included angle can vary from zero degrees to 180 degrees. The relative radial angle of separation between ES probe tips 173 and 175 ($\theta_{173}-\theta_{175}$) equals 180 degrees. ES probe tip 174 is positioned with its axis falling on ES source centerline 177. The relative angle between either ES probe tip 173 or 175 and ES probe tip 174 is 60 degrees. The relative angles between all ES tips probes mounted simultaneously in ES source chamber 161 can vary from close to zero to over 180 degrees depending on the analytical application being run. The radial probe separation can range from 0 to 360 degrees. Multiple ES probes can alternatively be mounted on ES source back plate 179 as is shown in FIG. 1 or through the side walls of ES chamber 161 as shown in FIG. 8, each with fixed positions or individual position adjusters. One or more ES probes can be mounted on the back plate as shown in FIG. 1 or ES probe assemblies mounted on back plate 178 may be configured with one or more ES probe assemblies which extend through a side wall or walls of ES chamber 161 as shown in FIG. 8.

A portion of the ions produced from the simultaneous Electrospraying of solutions from at least two of ES probes tips 173, 174 and/or 175 are swept into vacuum, through capillary orifice 164, where they are mass analyzed. With the appropriate liquid delivery systems, the solution flow to ES probe tips 173, 174 or 175 can be turned on or off independent of the layered liquid flow or nebulizer gas flow supplied to any given ES probe tip. For example, Electrospray from ES probe tip 173 can be turned off if the sample liquid flow through line 179 to ES probe assembly 170 were tuned off independent of whether the sample liquid flow through line 180 to ES probe assembly 172 remains on. The nebulizer gas flow to ES probe assembly 170 supplies through line 180 can remain on independent of the sample solution flow status through line 178. Leaving the nebulizer gas flow on, even with solution flow through ES probe 170 turned off, retains the optimal drying gas flow characteristics in ion mixing region 182 where the nebulization gas from ES probes and ES source counter current gas flow 183 meet. After the gas flow balance into region 182 has been optimized, the gas flow into this region can remain constant even when sample flow is introduced through one or more ES probes individually or simultaneously. Optimal ES-MS performance can be achieved when multiple nebulization gas flows remain on even with combinations of sample flows being turned on an off independently through multiple ES probe tips. Alternatively, the gas and liquid flow supplied to ES probe tip 175 can be alternately switched on when the gas and liquid flow supplied to ES probe tip 173 is turned off. The liquid and gas flow through ES tip 174 can remain ion while spraying sample solution from either ES probe tips 173 or 175. In the embodiment diagrammed in FIG. 8, ES probe tips 173 and 175 are located in a positions that are radially symmetric relative to the position of ES probe tip 174. Gas flow through ES probe tips 173 and 175 can be adjusted to be symmetric and equal in mixing region 182 when the liquid and gas flows to ES probe tips 173 and 175 are switched on and off in an alternating manner. The relative positions of each probe can also be adjusted so that performance is optimized different liquid flow rates are delivered through ES probe tips 173 and 175. In the case of alternating Electrospraying through ES probe tips 173 and 175, calibration solution can be delivered through ES probe 174 to provide an internal standard in the acquired mass spectrum when spraying individually or simultaneously from ES probe tips 173 and 175. When a heated capillary is configured in API source, heated counter current gas flow 183 may or may not be required. Partially evaporated charged liquid droplets swept into a heated capillary evaporate further on the way to vacuum. Ions produced from multiple solution sources, mix in partial vacuum or in vacuum prior to mass analysis. Ion mixtures may be formed by trapping ions produced from different Electrospray probes in three dimensional ion traps or multipole ion guides operated as two dimensional ion traps in vacuum as well. Mixtures of ions in three and two dimensional ion can be formed by trapping ions formed from simultaneous or individual sequential Electrospraying from multiple ES probes.

Individual separation systems such as LC, CE or CEC can serve as the solution delivery systems to different ES probes configured in an ES chamber. Multiple ES probes configured in an Electrospray ion source allow a single ES mass spectrometer system to serve as a detector for multiple separation systems without the need to switch eluting samples through a common probe. A common ES probe may not be optimally configured or even compatible for each separation system configured with the ES source. Multiple ES probes avoids cross contamination from one sample injection to the next delivered from individual separate systems. The separation of compounds spatially in solution is generally the slow step of an LC, CE or CEC MS analytical analysis, particularly when a mass spectrometer capable of rapid data acquisition, such as Time-Of-Flight, is used. The use of multiple ES probes combined with efficient manual or automated sample introduction increases analytical throughput with no risk of performance loss due sample cross contamination. The mass spectrometer, configured to operate in MS or MS/MS$^n$ mode with multiple separation systems, can serve as a detector for a wide range of chemical analysis run in a manual or automated mode without the need to change or adjust component hardware. One embodiment of multiple separation systems interfaced to a single ES source is diagrammed in FIG. 8. A first gradient liquid chromatography system 184 comprises LC gradient pump 185, injector valve 186, manual or auto injector 187, liquid chromatography column 188, switching valve 191, and connecting line 180 to ES probe assembly 172. Similarly, a second gradient LC system 194 comprises LC gradient pump 195, injector valve 196, manual or auto injector 197, liquid chromatography column 198, switching valve 199, and connecting line 179 to ES probe assembly 170. Sheath liquid flow can be delivered through transfer line 192 to ES probe assembly 172 and through connecting line 201 to ES probe assembly 170. Nebulizing gas is delivered through lines 193 and 181 to ES probe assemblies 172 and 170 respectively. In the configuration shown, the following sequence could be used to double the sample throughput with LC-MS analysis using one Electrospray mass spectrometer detector.

Assume that during each LC-MS run, calibration solution is sprayed continuously from ES probe tip 174 while MS data is being acquired. The LC-MS analytical sequence begins with valve 191 switched so that solution delivered from LC gradient pump 185 is directed to flow through line 189 with no sample solution flow directed to ES probe inlet line 180. With valve 191 switched to this position, column 188 can be flushed or reconditioned after an LC gradient run without introducing contamination into ES source 160. The pneumatic nebulization gas flow to ES probe tip 175 may or may not be turned on depending on how the gas flows in mixing region 182 are initially balanced. Valve 199 is switched so that solution delivered from LC gradient pump 195 flows into transfer line 179 to ES probe assembly 170 exiting at ES probe tip 173. LC column 198 has been reconditioned or flushed and the solution composition being delivered from LC pump 195 is the solution required for initiation of an LC gradient run. Sample is injected from manual or autoinjector 197 into valve 196 and an LC separation is initiated when injector valve 196 is switched from load to run placing the injected sample on line with column 198. Nebulization gas and, if required, liquid layered flow is delivered to ES probe tip 173 in addition to the sample solution. As the LC gradient separation through column 198 proceeds, components eluting from column 198, travel through valve 199 and line 179 where they are Electrosprayed from tip 173. A portion of the ions produced the sample solution during the Electrospray ionization process are subsequently mass analyzed. During and prior to the completion of the analytical gradient LC run which is occurring in LC column 198, column 188 is being flushed, reconditioned, or re-equilibrated and the solution gradient reset for another LC gradient separation. When the LC gradient run through column 198 is complete, valve 199 is switched so that the eluate from LC column 198 flows through line 202 and not through line 179. Alternatively, an additional solvent flow can be supplied through line 200 into line 179 through valve 199 in this switch position to flush line 179 prior to the start of the LC gradient run through ES probe assembly 172. When valve 199 is switched to divert the flow through column 198 to line 202, valve 191 is switched to connect the flow exiting column 188 to line 180 and ES probe assembly 172. If the pneumatic nebulization gas flow to ES probe 172 was turned off while the gradient LC run through column 198 was occurring, it is turned back on at this point. Nebulization gas supplied through line 181 to ES probe assembly 170 may remain on or be turned off depending on how the spray gas balance in region 182 has been optimized. A sample is injected into injector valve 186 with manual or auto injector 187 and an LC gradient separation begins with LC system 184 when valve 186 is switched from inject to run. Sample bearing solution eluting from column 188 is delivered to ES probe tip 175 through line 180 and is Electrospray into ES chamber 161. A portion of the sample ions resulting from the Electrospray process are drawn into vacuum through orifice 164 where they are mass analyzed. When the gradient LC run through LC column 188 is complete, valve 191 is once again switched so that solution flow from LC column 188 is directed to flow through line 189 and the cycle described above begins again. Solution flow can be delivered through line 190 to ES probe assembly 172 to flush line 180 prior to initiating the next gradient run through LC column 198.

The analytical sequence example described above includes switching between two LC separation systems using one ES-MS detector to increase sample throughput. While one LC column is being flushed after an LC run, an analytical separation is being conducted using a second LC separation system. Sample solution from LC system 194 is delivered to ES source 160 through ES probe assembly 170 and sample solution from LC separation system 184 is delivered to ES source 160 through ES probe assembly 172. A calibration solution can be delivered to ES source 160 through ES probe assembly 171 simultaneously with the Electrospraying of either LC separation solutions to create an ion mixture. A mass spectrum acquired from the resulting ion mixture contains an internal standard peaks which can be used for mass calibration and/or quantitative analysis calculations.

Several variations to the multiple ES probe embodiment diagrammed in FIG. 8 can be configured. One variation would be to eliminate switching valves 191 and 199 and send the solution flow from columns 188 and 198 directly into ES probe assemblies 170 and 172. This would reduce dead volume and even allow the incorporation of fused silica packed columns as the first layer sample delivery tube configured in ES probe assemblies 170 and 172 exiting at ES tips 173 and 175 respectively. During the column flushing period prior to an LC analytical run, say for ES probe assembly 170, the position of ES probe tip 173 can be moved so that any spray from tip 173, from flow through column 198, would be directed away from mixing region 182 when ES probes 171 and 172 are spraying. Probe tip 173 would then be moved back into position when the analytical separation through column 198 was reinitiated. ES probe tip 175 would then be moved to a position during flushing of LC column 188 such that any spray from tip 175 would not be directed into mixing region 182. In this second position, any spray from tip 175 during flushing through column 188 would not contribute chemical noise to acquired mass spectra during the LC-MS analysis of samples flowing through LC column 198. The positions of ES probe assemblies 170 and 172 can be changed with automated adjustment means during programmed multiple LC column analysis sequences.

An alternative and simpler method to recondition or flush LC columns between LC runs through an ES probe assembly without the need to move the ES probe position, is to turn off the nebulizing gas through the appropriate ES probe tip and change the electrical potentials applied to the ES probe tip during LC column reconditioning. The electrical potential should be switched or changed to a value which prevents unassisted Electrospray from occurring from the ES probe tip during LC column reconditioning. Solution exiting the ES probe tip from the LC column being reconditioned would then drip off and flow out the ES source chamber drain. As an example of this method, consider an LC gradient run Electrosprayed with nebulization assist through ES probe tip 175 while LC column 198 is being reconditioned with solution flowing through ES probe tip 173. In this example, switching valves 191 and 199 have been eliminated and LC columns 198 and 188 are connected directly to or are incorporated into ES probe assemblies 172 and 170 respectively. Nebulization gas flow to ES probe tip 173 is turned off during the LC column reconditioning and any ions produced from unassisted Electrospray of the liquid emerging from ES probe tip 173 may be prevented from effectively entering mixing region 182 by the opposing nebulizing gas flow from ES probe assembly 172. Unassisted Electrospray from ES probe tip 173 can be prevented by applying a potential to ES probe tip 173 which is effectively equal to the local electric field potential collectively formed by the electrical potentials applied to ES source cylindrical lens 162, endplate 165 and capillary entrance electrode 204. Liquid flowing through LC column 198 which emerges at ES probe tip 173 will drip off into ES source chamber 161 without contributing ions into mixing region 182. Similarly, the nebulizing gas flow can be turned off and the electrical potential applied to ES probe tip 175 can be changed to prevent unassisted Electrospray when liquid is flowing from LC column 188 through ES probe tip 175 during reconditioning.

Additional analytical apparatus configurations are possible with combinations of multiple LC, CEC and/or CE separation systems configured in series or in parallel supplying solution to multiple ES probes. As an example, a capillary column or micro bore column can be configured in LC system 194 while and LC system 184 is configured with a standard 4.6 mm inner diameter LC column. ES probe assembly 175 can be configured with the capillary LC column incorporated as part of the ES probe assembly to minimize dead volume while ES probe assembly 170 is configured to accommodate the higher liquid flow rates delivered from larger bore column 198. The location of probe tips 175 and 173 can be positioned to optimize performance for specific and different liquid flow rates spraying from each ES probe tip. A system may also be configured with fast flow injection analysis using injector valves 186 and 196 and manual or auto injectors 187 and 197 in alternating sequence. This alternating sample injection sequence operating mode increases the rate at which samples cam be mass analyzed by reducing the relatively slow injection rate cycle time of currently available auto injectors. An "open access" system can be configured with LC, CE and /or flow injection analysis to allow the conducting of multiple LC-MS, CE-MS or flow injection MS analysis with a single ES-MS detector system where no hardware reconfiguration is required.

More than three ES probe assemblies, each with different or similar configurations, can be mounted in ES chamber 160. Each ES probe assembly can be configured to accommodate different separation systems or sample injectors. One ES probe assembly may interface to an LC system, another to a CE or CEC system, another to an auto injector inlet and yet another to a calibration sample delivery system. Using multiple ES probe assembly configurations, an ES-MS or an ES-MS/$MS^n$ system can be configured for a wider range of automation sample analysis techniques. Several widely diverse sample analysis techniques can performed in sequence or simultaneously with a single mass analyzer in an automated and unattended manner. Mass analyzers are generally more expensive as detectors than separation systems, consequently, the configuration of multiple ES probes in one ES source allows cost effective operation with multiple separation systems connected to a single API mass analyzer detector. Multiple ES probe assembly configurations can also save downtime due to component setup time by allowing simple switching from one analytical method to another.

Another embodiment of the invention is the configuration of an Atmospheric Pressure Chemical Ionization (APCI) source with multiple sample solution inlet probes or nebulizers interfaced to a mass analyzer. Each sample inlet probe can spray solution independently of other sample inlets either separately or simultaneously during APCI operation. APCI inlet probes or nebulizers can be configured to accommodate solution flow rates ranging from below 500 nL/min to above 2 mL/min. The invention includes configuring at least two APCI inlet probes with fixed or adjustable positions which independently spray solutions into a common vaporizer during APCI source operation. Solutions are delivered to the multiple APCI inlet probes configured with pneumatic nebulization through different liquid lines fed by individual liquid delivery systems. Different samples, mixture of samples and/or solutions can be sprayed simultaneously through multiple APCI inlet probes. The liquid delivery systems include but are not limited to liquid chromatography pumps, capillary electrophoresis separation systems, syringe pumps, gravity feed vessels, pressurized vessels, and/or aspiration feed vessels. Auto injectors and/or manual injection valves may be connected to one or more APCI inlet probe nebulizers for sample or calibration solution introduction. Similar to the operation of multiple ES probes in one ES source, multiple APCI nebulizers configured in one APCI source allow the introduction of multiple samples simultaneously or sequentially with different compositions and different liquid flow rates. A calibration solution can be introduced into an APCI source through one inlet probe with a sample solution introduced independently through a second inlet probe. Both calibration and sample solutions flows can be sprayed simultaneously without mixing chemical components in solution. The resulting sprayed droplet mixture is transferred into the APCI vaporizer. Ions are produced from the vaporized mixture in the corona discharge region of the APCI source. A portion of the ions produced from the vapor mixture are swept into vacuum where they are mass analyzed. The acquired mass spectrum of the ion mixture contains peaks of ions produced from compounds present in each sample and calibration solution. The calibration peaks create an internal standard used for calculating the m/z assignments of sample related peaks. Simultaneously spraying from separate sample and calibration solutions allows the acquisition of mass spectra with internal standard peaks without mixing sample and calibration solutions prior to solution nebulization. The multiple inlet probe spraying prevents contamination of sample solution lines with calibration compounds and allows the selective and rapid turning on and off of calibration solution flow. The use of multiple solution inlet probes in APCI sources can also be used to introduce mixtures of chemical components in the gas phase to investigate atmospheric pressure gas phase interactions and reactions of different samples and solvents without prior mixing in solution.

Figure 9:
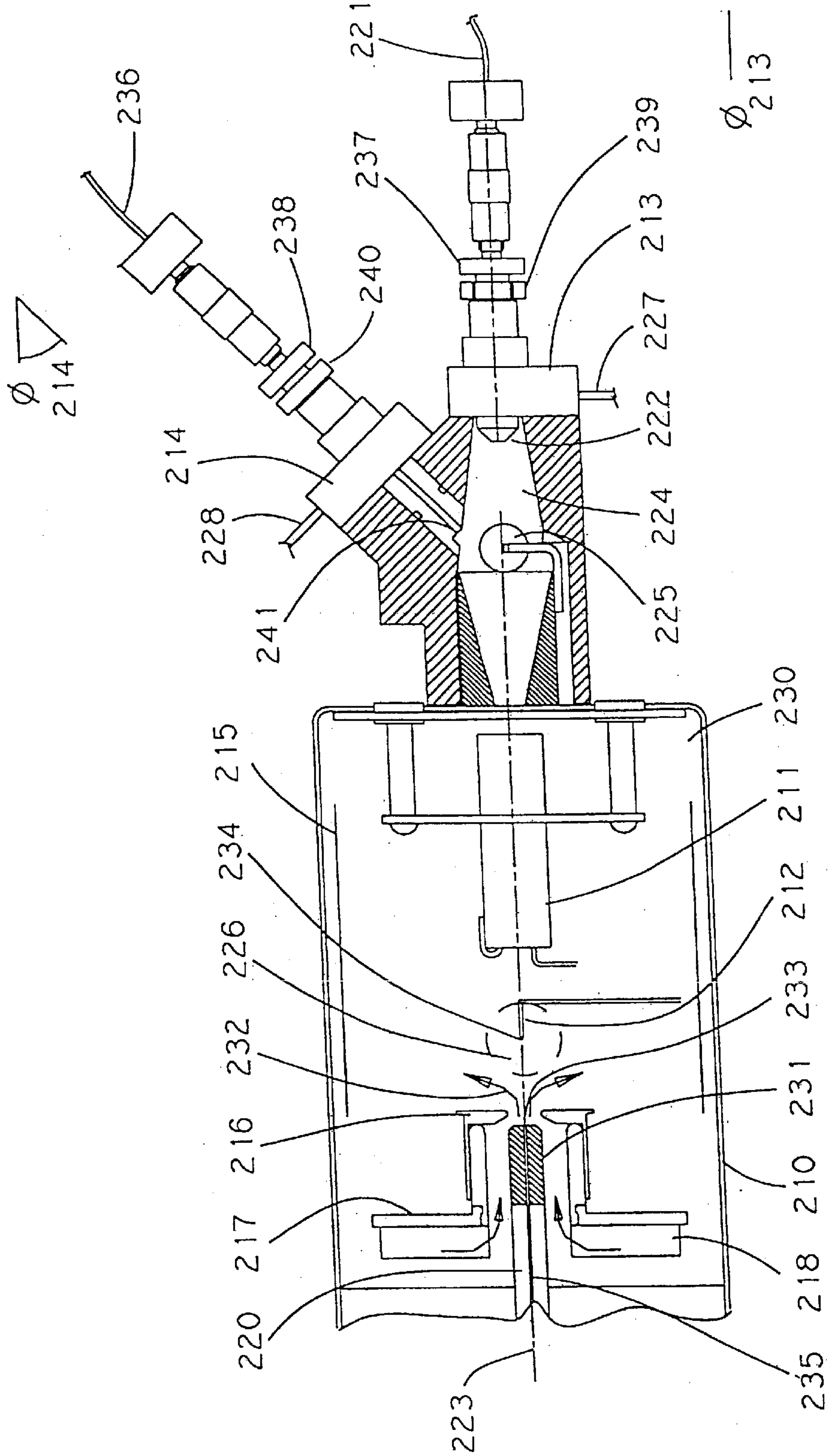
FIG. 9 is a diagram of an Atmospheric Pressure Chemical Ionization source with two independent sample inlet probes configured with one probe angled off-axis to the APCI source centerline and one probe aligned with the APCI source centerline.

One embodiment of the invention is an APCI source, interfaced to a mass analyzer, configured with two sample inlet nebulizers assemblies shown in FIG. 9. APCI source 210 is configured with a heater or vaporizer 211, corona discharge needle 212, a first APCI inlet probe assembly 213, a second APCI inlet probe assembly 214, cylindrical lens 215, nosepiece 216 attached to endplate 217, counter current gas heater 218 and capillary 220. Solution introduced through connecting tube 221 into APCI inlet probe assembly 213 is sprayed with pneumatic nebulization from APCI inlet probe tip 222. Nebulization gas is supplied to APCI nebulizer probes 213 and 214 through gas delivery tubes 227 and 228 respectively. APCI inlet probe assembly 213 is configured to spray parallel ($Ø_{213}$=0°) with the APCI source centerline 223 into cavity 224. The sprayed liquid droplets traverse cavity 224, flow around droplet separator ball 225 and into vaporizer 211. The sprayed liquid droplets evaporate in vaporizer 211 forming a vapor prior to entering corona discharge region 226. Corona discharge region 226 surrounds corona discharge needle tip 234. Additional makeup gas flow may be added independently into region 224 or through APCI inlet probe assemblies 213 or 214 to aid in transporting the droplets and resulting vapor through the APCI source assembly 210. An electric field is formed in APCI source 230 by applying electrical potentials to cylindrical lens 215, corona, discharge needle 212, endplate 217 with attached nosepiece 216 and capillary entrance electrode 231. The applied electrical potentials, heated counter current gas flow 232 and the total gas flow through vaporizer 211 are set to establish a stable corona discharge in region 226 around and/or downstream of corona needle tip 234. The ions produced in corona discharge region 226 by atmospheric pressure chemical ionization are driven by the electric field against counter current bath gas 232 towards capillary orifice 233. A portion of the ions produced are swept into vacuum through capillary orifice 235 where they are mass analyzed. In the embodiment shown, cavity 224 is configured with a droplet separator ball 225. Separator ball 225 removes larger droplets from the sprays produced by the nebulizer inlet probes preventing large droplets from entering vaporizer 211. Separator ball 225 is installed when higher liquid flow rates are introduced typically ranging from 200 to 2,000 microliters per minute. Separator ball 225 can be removed when lower solution flow rates are sprayed to improve sensitivity. A second APCI inlet probe assembly 214 is configured to spray at an angle of 45 ($Ø_{214}$=45°) relative to APCI source centerline 223 into cavity 224 as shown in FIG. 9. Solution flow delivered to both APCI inlet probes 213 and 214 through liquid delivery lines 221 and 236 respectively can be controlled so that both APCI inlet probes can spray solution simultaneously or separately into cavity 224. Nebulizer spray performance for APCI probes 213 and 214 can be optimized by adjusting solution delivery tube exit position with adjusting screws 237 and 238 and locking nuts 239 and 240 respectively.

Different liquid flow rates and different solution types can be simultaneously or separately sprayed through APCI inlet probes 213 and 214. For example, the output of a liquid chromatography separation system can be sprayed through APCI inlet probe 213 at a flow rate of 1 mL/min, while simultaneously a calibration sample solution is sprayed from APCI inlet probe 214 at a flow rate of 10 ul/min delivered through connecting tube 236. The sprayed droplet mixture forms a vapor mixture as it passes through vaporizer 211. A mixture of ions is formed from the vapor mixture as it passes through corona discharge region 226. A portion of the mixture of ions produced is swept into vacuum along with neutral gas molecules through capillary orifice 235 and the ions are mass to charge analyzed by a mass spectrometer. The acquired mass spectrum contains peaks of ions from the calibration sample which can be used as an internal standard to improve mass measurement accuracy and quantitation of the unknown sample peaks in the acquired mass spectrum. Alternatively, the second APCI inlet probe 214 can be used to introduce a sample solution that will create a desired solvent or ion mixture which will interact favorably in vaporizer 211 or corona discharge region 226 with the sample vapor resulting from the solution sprayed from APCI inlet probe 213. It may not be desirable to mix the second solution with the sample solution prior to spraying. Spraying different solutions from multiple APCI probes can improve the APCI signal for an unknown sample or interactions of gas phase mixtures of neutral molecules or ions can be studied with atmospheric pressure chemical ionization. To avoid mixing vaporized samples molecules or ions in the gas phase, APCI probes 213 and 214 can spray solutions in a sequential manner. For example, a calibration solution flow delivered to APCI inlet probe 214 can be turned off while a mass spectrum is acquired from a sample solution delivered to the APCI source through APCI inlet probe 213. The calibration solution flow delivered through connecting tube 236 to APCI probe 214 is then turned on to acquire an external standard calibration mass spectrum while the sample solution flow id turned off. Calibration mass spectrum can be acquired sequentially and/or simultaneously with the mass spectrum acquired for an unknown sample by turning on and off the appropriate solution flows during APCI source operation. Introducing calibration solution through a separate APCI inlet probe avoids contaminating the sample solution inlet line and probe in analytical applications requiring APCI. The mass spectra of the known and unknown samples can be added together in the data system to create a pseudo internal standard. Alternatively, sequentially acquiring mass spectra with and without an internal standard allows a direct comparison between the acquired sample mass spectra to check for any undesired effect that the calibration solution may cause to the acquired sample ion population.

Figure 10A:
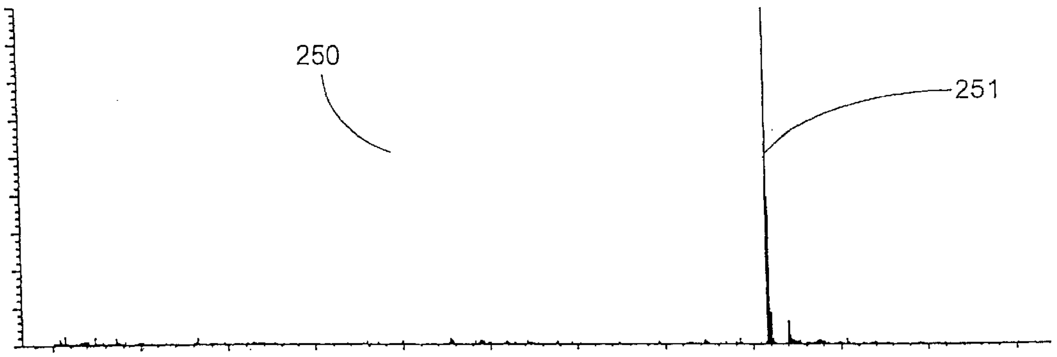
FIGS. 10A–C contain mass spectra of sample and calibration solutions sprayed separately from individual APCI inlet probes and a mass spectrum of sample and calibration solutions sprayed simultaneously in a dual inlet probe APCI source configured as shown in FIG. 9.
Figure 10B:
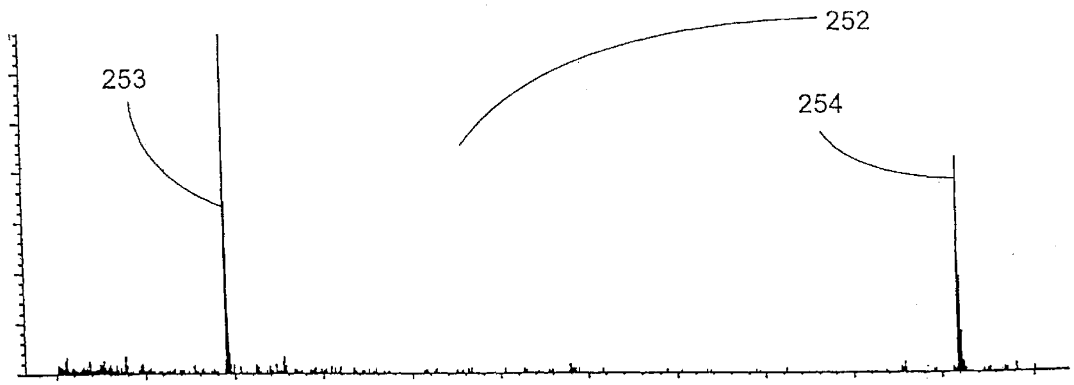
Figure 10C:
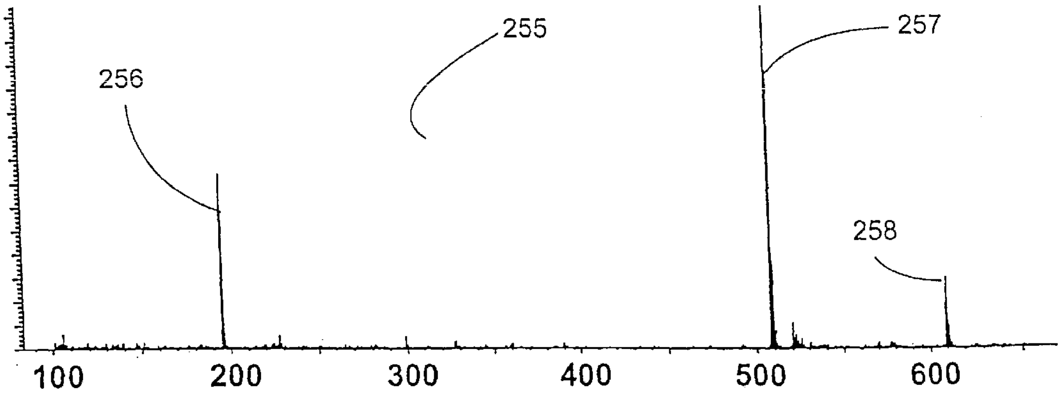

An example of the APCI-MS operation of a dual probe APCI source as configured in FIG. 9 is shown in FIG. 10. Mass spectra 250, 252 and 255 shown in FIG. 10 were acquired with dual probe APCI source interfaced to a quadrupole mass analyzer. Mass spectrum 250 of a sample solution was acquired while infusing 2 pmole/ul of leucine enkephalin in a 1:1 solution of methanol:water with 0.1% acetic acid at a flow rate of 100 ul/min. The leucine enkephalin solution was delivered from a syringe pump though liquid delivery line 221 to APCI inlet probe nebulizer 222 during APCI operation. No liquid flow or nebulizer gas was delivered to APCI probe 214 during the acquisition of mass spectrum 250. Mass spectrum 250 contains protonated molecular ion peak 251 of leucine enkephalin. Mass spectrum 252 of a calibration solution was acquired from a mixture of 50 pmol/ul each of tri-tyrosine and hexa-tyrosine in an solution of 80:20 water:iso-propanol, 2% propionic acid at a flow rate of 5 ul/min. The calibration solution was delivered from a solution reservoir through delivery line 236 pulled by the venturi of pneumatic nebulizer 241 configured in APCI inlet probe 214. Mass spectrum 252 contains calibration peaks 253 and 254 of protonated tri-tyrosine and hexa-tyrosine respectively. Sample liquid flow to APCI inlet probe 213 was turned off during the acquisition of mass spectrum 252. Mass spectrum 255 of FIG. 10 was acquired while simultaneously spraying sample and calibration solutions from APCI inlet probes 213 and 214 respectively. Solution compositions and flow rates were the same as was described above for individual spraying. Mass spectrum 255 contains internal standard peaks 256 and 258 of protonated tri-tyrosine and hexa-tyrosine respectively and sample compound peak 257 of protonated. leucine enkephalin. The calibration peaks acquired as internal standards can be used to improve the calculated mass measurement of sample related peak 257.

Electrospray ionization, an APCI source creates sample and solvent molecule vapor prior to ionization. The APCI ionization process, unlike Electrospray, requires gas phase molecule-ion charge exchange reactions. Consequently, mixing samples, via multiple inlet probe introduction, in the gas phase in an APCI source may allow enhanced opportunity to study neutral molecule and ion molecule reactions which occur in the gas phase while avoiding solution chemistry effects. Gas phase sample interaction can be avoided, if desired, by introducing sample sequentially through multiple APCI inlet probes. The nebulizer gas can remain on or be turned off when the liquid sample flow through an APCI inlet probe is turned off. The venturi effect from the nebulizing gas at the tip of an APCI inlet probe may be used to pull the sample from a reservoir to the APCI inlet probe tip. This technique avoids the need for an additional sample delivery pump. Multiple APCI probes can be fixed in position as diagrammed in FIG. 9 or can have adjustable sprayer positions relative to each other, cavity 224 or vaporizer 211. Each APCI inlet probe is removable and a single APCI source assembly can be configured with one or more APCI inlet probes mounted in a variety of positions. It is clear to one skilled in the art that more than two APCI inlet probes can be added to APCI source 210. Each APCI inlet probe can be configured at different angles relative to the APCI source centerline and each APCI inlet probe position can be fixed or adjustable during operation of the APCI source. APCI inlet probe tips can be configured at any position axially and radially upstream of vaporizer 211 or even configured to spray directly into corona discharge region 226. Multiple vaporizers and corona discharge needles can also be configured into APCI source 210. The relative radial positions of multiple APCI nebulizers spraying into a vaporizer can be set at any desired angle, radial position and tilt angle relative to the vaporizer centerline. The tips of each APCI inlet probe can be positioned to optimize nebulizer performance for a given solution flow rate and analytical application.

Figure 11:
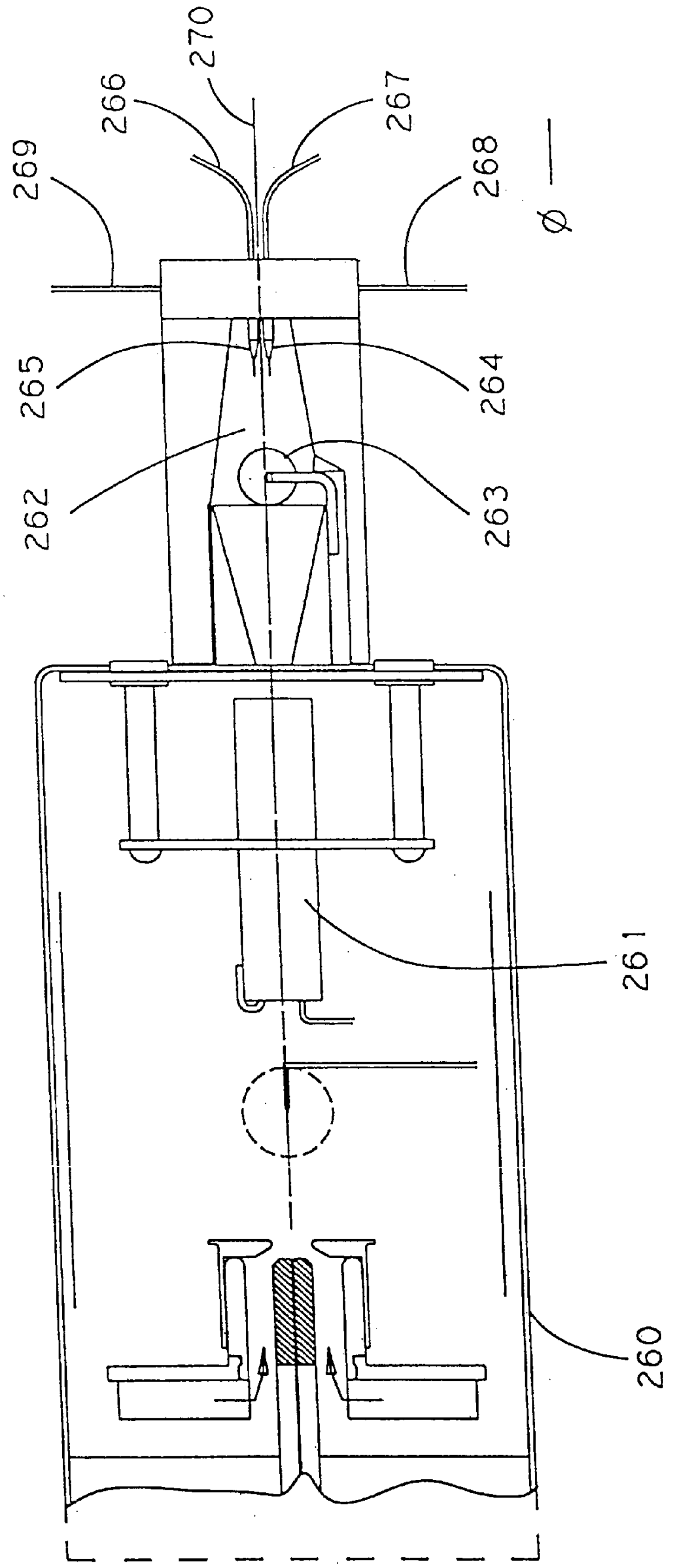
FIG. 11 is a diagram of an Atmospheric Pressure Chemical Ionization source configured with two APCI sample inlet pneumatic nebulization tips oriented to spray in a substantially parallel direction.

An alternative embodiment of the invention is diagrammed in FIG. 11 which shows a dual inlet probe APCI source with two inlet probes configured to spray in a direction parallel to the APCI source axis. APCI source chamber 271 of APCI source 260 is configured similar to APCI source chamber 230 of APCI source 210 diagrammed in FIG. 9. APCI source 260 is configured with two pneumatic nebulization APCI inlet probes 264 and 265 which connect to liquid delivery lines 266 and 267 respectively. Nebulizer gas lines 268 and 269 supply nebulization gas separately to APCI inlet probes 264 and 265 respectively. In the embodiment shown, both APCI inlet probes 264 and 265 are configured such that axis of each pneumatic nebulizer sprayer axis is positioned to be approximately parallel with APCI vaporizer 261 axis 270. Different solutions are sprayed individually or simultaneously from both inlet probes 264 and 265 into region 262. A portion of the sprayed droplets pass around separator ball 263 and flow into vaporizer 261. The sprayed liquid droplets evaporate in vaporizer 261 and ions are formed from the vapor as it passes through corona discharge region. A portion of the ions produced pass into vacuum through capillary orifice 273 and are mass to charge analyzed with a mass spectrometer and ion detector. Alternatively, APCI source 260 can be configured with more than two APCI inlet probes positioned in parallel and spraying in a direction parallel to vaporizer axis 270 into region 262. A set of parallel APCI inlet probes positioned near and spraying parallel with vaporizer axis 270 can be configured with single or multiple off axis angled APCI inlet probes. Multiple APCI inlet probes can be connected to a variety of liquid reservoirs, delivery systems or separation systems supplying separate sample solutions and/or calibration solutions to each individual APCI inlet probe. Alternatively, the axis 270 of vaporizer 261 may be configured at an angle from axis 274 of capillary 275. Axis 270 of vaporizer 261 and, consequently the axis of inlet probes 264 and 265 can be configured at an angle from 0 to over 120 degrees relative to axis 274 of capillary 275. As will be shown in an alternative embodiment of the invention, off axis APCI vaporizer and inlet probe positioning allows the configuration of multiple APCI vaporizer, inlet probe and corona discharge APCI sources.

Similar to the Electrospray ionization source diagrammed in FIG. 8 with multiple ES probes, multiple separation systems can be configured to deliver sample solutions into an APCI source configured with multiple inlet probes. As described for the ES source, sample throughput can be increased using a single APCI-MS detector for multiple sample separation or inlet systems. Multiple sample inlet probes configured in an APCI source can extend the range of analytical procedures which can be automatically or manually run sequentially or simultaneously with one APCI-MS instrument. The configuration of multiple APCI inlet probes in one APCI source can also minimize the time and complexity required to reconfigure and re-optimize an APCI source for different analytical applications.

An alternative embodiment of the invention is the combination of at least one Electrospray probe with at least one Atmospheric Pressure Chemical Ionization probe and vaporizer configured in an Atmospheric Pressure Ion Source interfaced to a mass analyzer. It is desirable for some analytical applications to incorporate both ES and APCI capability in one API source. Rapid switching from ES to APCI ionization methods without the need to reconfigure the API source minimizes the time and complexity to conduct API-MS or API-MS/MS$^n$ experiments with ES and APCI ion sources. The same sample can be introduced sequentially or simultaneously through both APCI and ES probes to obtain comparative or combination mass spectra. Acquiring both ES and APCI mass spectra of the same solution can provide a useful comparison to assess any solution chemistry reactions or suppression effects with either ES or APCI ionization. Both ES and APCI probes can have fixed or moveable positions during operation of the API source. Alternatively, different samples can be introduced through the ES and APCI probes individually or simultaneously. For example, a calibration solution can be introduced through an ES probe while an unknown sample is introduced through an APCI probe into the same API source. The ES and APCI probe can be operated simultaneously or sequentially in this manner when acquiring mass spectra to create an internal or an external standard. The combination of ES and APCI probes configured together in an API source minimizes probe transfer and setup time and expands the range of analytical techniques which an be run with a manual or automated means when acquiring data with an API MS instrument. Several combinations of sample introduction systems such as separations systems, pumps, manual injectors or auto injectors and/or sample solution reservoirs can be connected to the multiple combination ES and APCI probe API source. This integrated approach allows fully automated analysis with multiple ionization techniques, multiple separation systems and one MS detector to achieve the most versatile and cost effective analytical tool with increased sample throughput and little or no downtime due to instrumentation reconfiguration.

Figure 14:
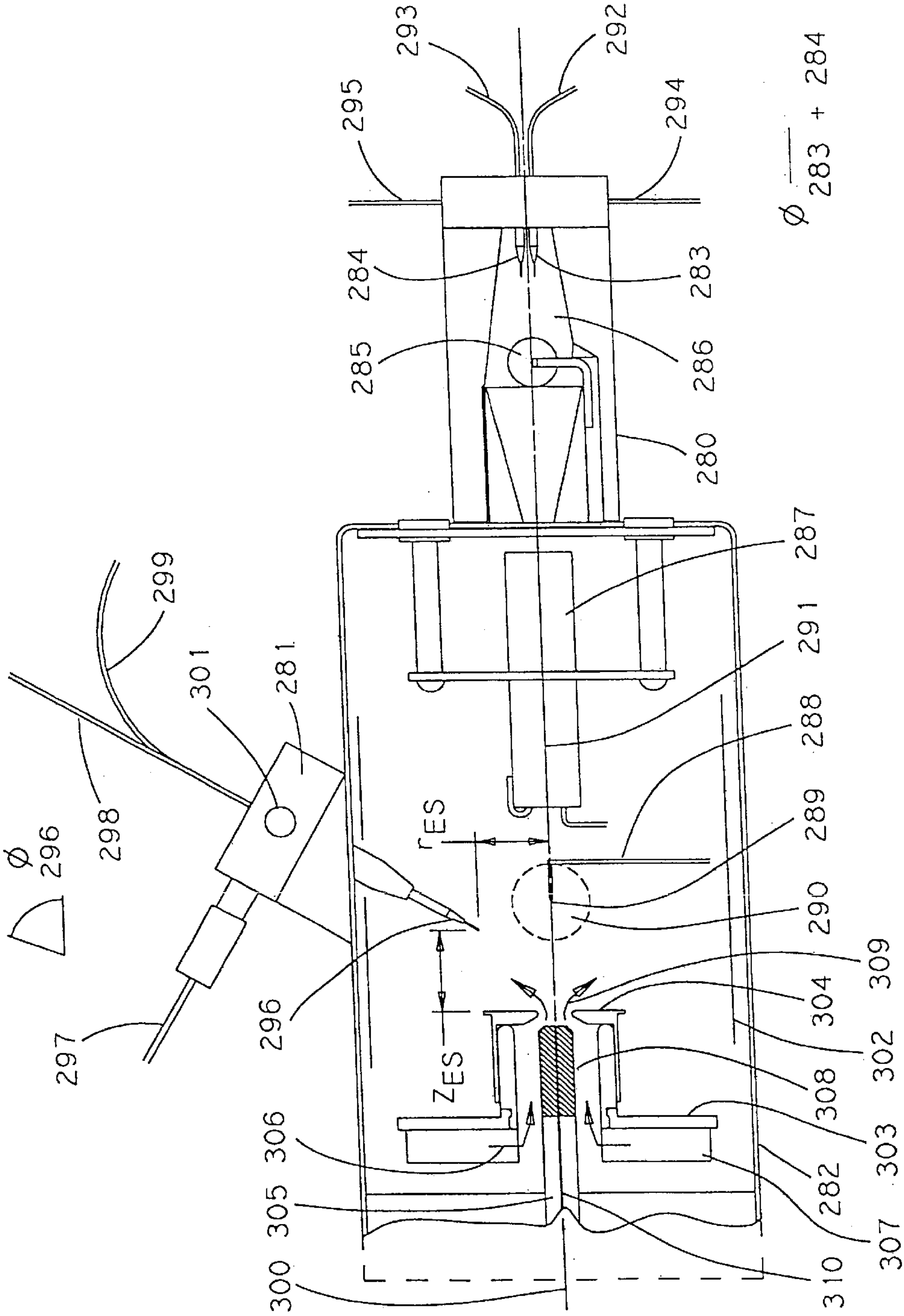
FIG. 14 is a diagram of an Atmospheric Pressure Ion Source configured with Electrospray probe assembly and an Atmospheric Pressure Chemical Ionization probe assembly.
Figure 15A:
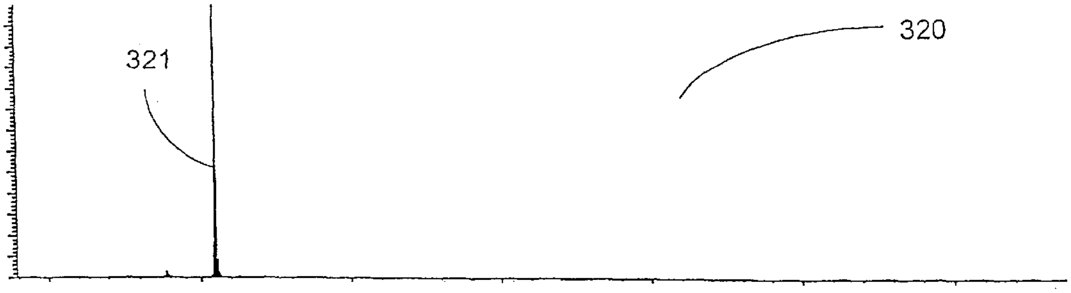
FIGS. 15A–D are a series of mass spectrum acquired separately and simultaneously from different sample solutions delivered to the Electrospray and APCI probes configured as shown in FIG. 14.
Figure 15B:
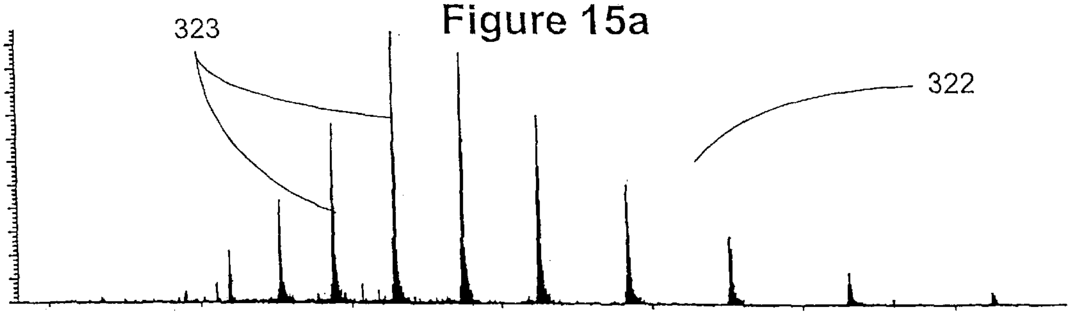
Figure 15C:
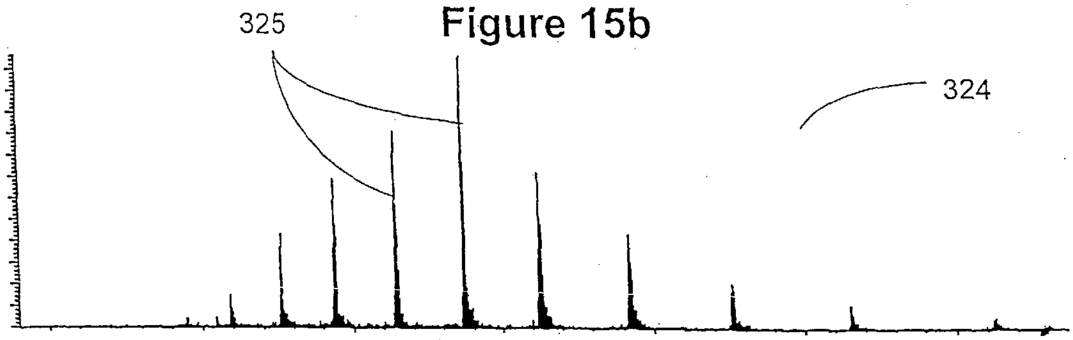
Figure 15D:
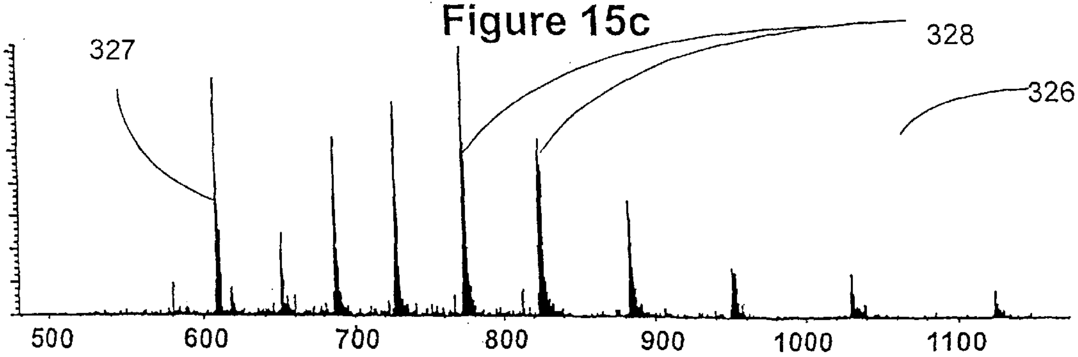

FIG. 14 is a diagram of an embodiment of the invention which includes individual or simultaneous ES and APCI ionization capability configured together in an API source interfaced to a mass analyzer. APCI inlet probe and ionization assembly 280 and an Electrospray probe assembly 281 are configured in API source assembly 282. APCI probe and ionization assembly 280 comprises dual inlet probes 283 and 284, spray region 286, optional separator ball 285, vaporizer 287 and corona discharge needle 288 with needle tip 289. APCI inlet probes 284 and 285 are configured to spray at an angle of ($Ø_{283\ \&\ 284}$=0°) relative to vaporizer 287 centerline 291. APCI inlet probes 283 and 284 are configured with separate solution delivery lines 294 and 295 and separate nebulizer gas lines 294 and 295 respectively. Electrospray probe assembly 281 comprises three layer spray tip 296 with gas delivery line 297, sample solution delivery line 298 and layered liquid flow delivery line 299. The ES probe tip 296 is configured to spray at an angle of ($Ø_{296}$=70°) relative to centerline 300 of API source 282. The position of ES probe tip 296 is adjustable using adjuster knob 301. Alternatively, ES probe assembly 281 may be configured with two or more ES probe tips positioned to spray at an angle relative to API source centerline 300.

API source 282 is additionally configured with cylindrical lens 120, endplate 303 with attached nosepiece 304, capillary 305, counter current drying gas flow 306 and gas heater 307. ES probe tip 296 is positioned a distance $Z_{ES}$ axially from nosepiece 304 and radially $r_{ES}$ from API source centerline 300. Electrical potentials applied to cylindrical lens 302, endplate 303 with nosepiece 304, capillary entrance electrode 308, ES tip 296 and APCI corona needle 288 can be optimized to operate both the ES and APCI probes separately or simultaneously. Counter current drying gas flow 309, the nebulization gas flow from ES probe tip 296 and the nebulizer, makeup and vapor gas flow through APCI vaporizer 291 can be balanced to optimize performance of simultaneous ES and APCI operation. Alternatively, the ES and APCI probes can be operated sequentially with fixed positions by turning on and off the solution and/or nebulizing gas flow for each probe sequentially. Mass spectra with ES ionization can be acquired with solution flow and voltages applied to the ES probe tip 296 turned on while solution flow to APCI inlet probe 283 and/or 284 and voltage applied to corona discharge needle 288 are turned off. Liquid flow and voltage applied to ES probe tip 296 can then be turned off with liquid flow to APCI inlet probes 283 and/or 284 and voltage applied to corona discharge needle 288 turned on prior to acquiring mass spectra with APCI ionization.

Different solutions or the same solutions can be delivered through the ES and APCI probes during acquisition of mass spectra. The electrical potentials applied to elements in the API source may be adjusted for ES and APCI operation to optimize performance for each solution composition and liquid flow rate. Also, voltages applied to elements or positions of elements in the API source may be changed and then reset to optimize ES or APCI operation. For example, if APCI assembly 280 operating and no sample is being delivered through ES probe 281, the voltage applied to ES probe tip 296 can be set so that tip 296 will appear electrically neutral to avoid interfering with the electric field in corona discharge region 290. Similarly, when ES probe 281 is operating and solution flow to APCI assembly 280 is turned off, voltage can be applied to corona discharge needle 289 such that it does not interfere with the Electrospray process or actually improves the Electrospray performance. For example, voltage applied to corona discharge needle 289 can aid in moving or focusing Electrospray produced ions toward capillary orifice 310. Alternatively, the position of APCI corona discharge needle 288 can be moved temporarily during ES probe operation to minimize interference with the Electrospray ionization process. APCI corona discharge needle 288 can then be moved back into position during operation of APCI probe assembly 280. Simultaneous ES and APCI operation can be configured to produce ions of opposite polarity. Ions produced in the APCI corona region 290 can be of one polarity, while spraying the ES needle at the corona needle can produce opposite polarity ES ions. Voltages applied to API source elements to achieve positive APCI generated ions and negative ES generated ions can be capillary entrance electrode 308 (−4,000V), endplate 303 and nosepiece 304 (−3,000V), cylindrical lens 302 (−2,000V), corona discharge needle 288 (−2,000V) and ES probe tip 296 (−5,000V). A portion of the resulting mixture of ions reacting at atmosphere of one polarity is enters vacuum through capillary orifice 310 and subsequently mass analyzed. Several combinations of sample inlet delivery systems, as have been described earlier, can be interfaced to the combination ES and APCI API source. Multiple ES and multiple APCI inlet probes can be included in an API source assembly. The ES and APCI probe assemblies can be configured to mount through the API source chamber walls, within the API chamber or through the API chamber back plate.

FIGS. 15A through 15D include mass spectra acquired from a combination API source configured similar to API source 282 diagrammed in FIG. 14 interfaced to a quadrupole mass spectrometer. Mass spectrum 320 shown in FIG. 15A was acquired with APCI ionization of a sample or 82 pmol/ul of reserpine in a 1:1 methanol:water with 0.015% formic acid solution sprayed from APCI probe 283 at a liquid flow rate of 200 ul/min. Mass spectrum 320 contains peak 321 of the protonated molecular ion of reserpine. Solution flow to ES probe tip 296 was turned off during the acquisition of APCI-MS generated mass spectrum 320. Mass spectrum 322 shown in FIG. 15B was acquired with Electrospray ionization of 10 pmol/ul of cytochrome C in a 1:1 methanol:water, 0.1% acetic acid solution spraying from ES tip 296 with pneumatic nebulization assist at a liquid flow rate of 10 ul/min. Mass spectrum 322 contains primarily the Electrosprayed multiply charged peaks 323 of cytochrome C. Solution flow to APCI inlet probe 283 was turned off during the acquisition of ES-MS spectrum 322. Mass spectrum 324 shown in FIG. 15C was acquired from the same cytochrome C solution Electrosprayed into API source 282 with pneumatic nebulization assist. During the acquisition of mass spectrum 324, containing peaks 325 of Electrospray generated multiply charged cytochrome C ions, the nebulizing gas was supplied to APCI inlet probe 283 with the vaporizer 287 heater turned on but with no high voltage applied to corona discharge needle 288 and no reserpine solution flowing to APCI inlet probe 283. Mass spectrum 326 shown in FIG. 15D was acquired with the same conditions as mass spectrum 324 with high voltage applied to corona discharge needle 288 and the same reserpine solution as above sprayed from APCI inlet probe 283. Both peak 327 of the protonated molecular ion of reserpine and peaks 328 of multiply charged protonated cytochrome C ions appear in mass spectrum 326 acquired with simultaneous ES and APCI ion production occurring in API source assembly 282. Mass spectra 320, 322, 324 and 326 were acquired sequentially with no position adjustment of API source 282 hardware. Raid switching between individual or simultaneous ES and APCI operating modes with combination source 282 shown in FIG. 14.

Figure 16:
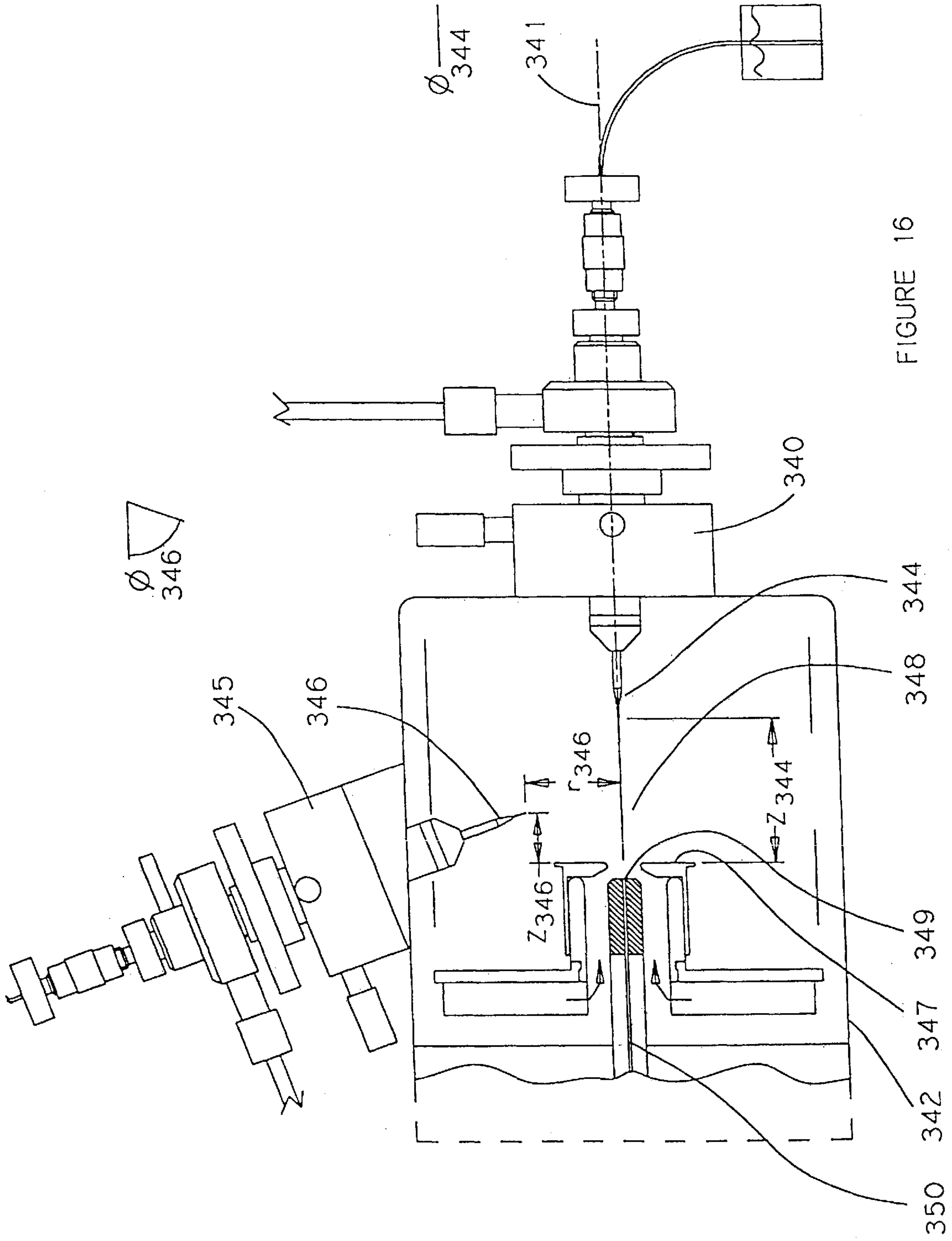
FIG. 16 is a diagram of an Electrospray ion source comprising two Electrospray probes which are configured to produce Electrospray ions of opposite polarity.

An API source with multiple ES or APCI probes or combinations of ES and APCI probes can be configured to allow the study of ion-ion interactions at atmospheric pressure. Many of the combination and multiple inlet probe API source configurations shown above can be operated using methods and techniques that will allow the study of gas phase ion-ion interactions at atmospheric pressure. Alternative embodiments of multiple inlet probe API sources configured specifically to allow the simultaneous production of opposite polarity ions will be described below. One embodiment of a multiple ES probe API source configured for studying ion-ion interactions at atmospheric pressure is diagrammed in FIG. 16. ES probe assembly 340 is configured with ES probe tip 344 located near axis 341 of API source 342 ($\phi_{340}$=0°) spaced a distance of $Z_{344}$ from API source nosepiece 347. Solution is Electrosprayed from ES probe tip 344 with pneumatic nebulization assist. The polarity of the Electrosprayed ions produced is determined by the relative potentials set on the electrostatic elements comprising API source 342. For purposes of discussion assume that the API source potentials and gas flows applied are set to produce positive ions from solutions Electrosprayed from ES probe tip 344.

A second ES probe assembly 345 is mounted with ES probe tip 346 positioned at a distance along API source axis 341, $Z_{346}$, from API source nosepiece 347 and radially, $r_{346}$, from API source axis 341. The angle of the spraying axis of ES probe tip 346 is positioned approximately at 110 degrees ($\phi_{346}$=110°) relative to API source centerline 341. The voltage applied to ES probe tip 346 is set such that negatively charged liquid droplets are produced from solution Electrosprayed from ES probe tip 346 with pneumatic nebulization assist. The positive and negative ions produced from the positive and negative charged liquid droplets Electrosprayed from ES probe tips 344 and 346 respectively mix and interact in region 348 of API source 342. This positive and negative ion-ion interaction at atmospheric pressure will cause the neutralization of some but not all of the mixed ion population. A portion of the resulting positive ion population will be driven to capillary entrance 349 by the electric fields present. A portion of the positive ions which enter capillary orifice 349 are swept through capillary bore 350 into vacuum and subsequently mass to charge analyzed with a mass spectrometer and detector. Reversing voltage polarities in API source 342, will cause negative ions to be produced from solution Electrosprayed from ES probe tip 344 and positive ions to be produced from solution Electrosprayed from ES probe tip 346. With polarities reversed, negative product ions will be move toward capillary entrance orifice 349, be swept into vacuum through capillary bore 350 and subsequently mass to charge analyzed.

Several geometries of ES probes can be configured to achieve multiple sample ion-ion interaction from different solutions Electrosprayed from multiple ES probe assemblies. More than two ES probes can be configured in an API source positioned at angles, $\phi_{l \ldots i}$ ranging from 0 to 180 degrees and rotation angles $\theta_{l \ldots i}$ ranging from 0 to 360 degrees. Selected neutral gas composition can be added to nebulizer or counter current drying gas to study ion-neutral reactions in relation to ion-ion interactions. Unlike the opposite polarity ion-ion interactive studies conducted in partial vacuum reported by Smith et. al., the embodiment of the invention described allows the production of ES ions in one API source chamber with ion-ion interaction conducted in higher ion and gas densities at atmospheric pressure.

Figure 17:
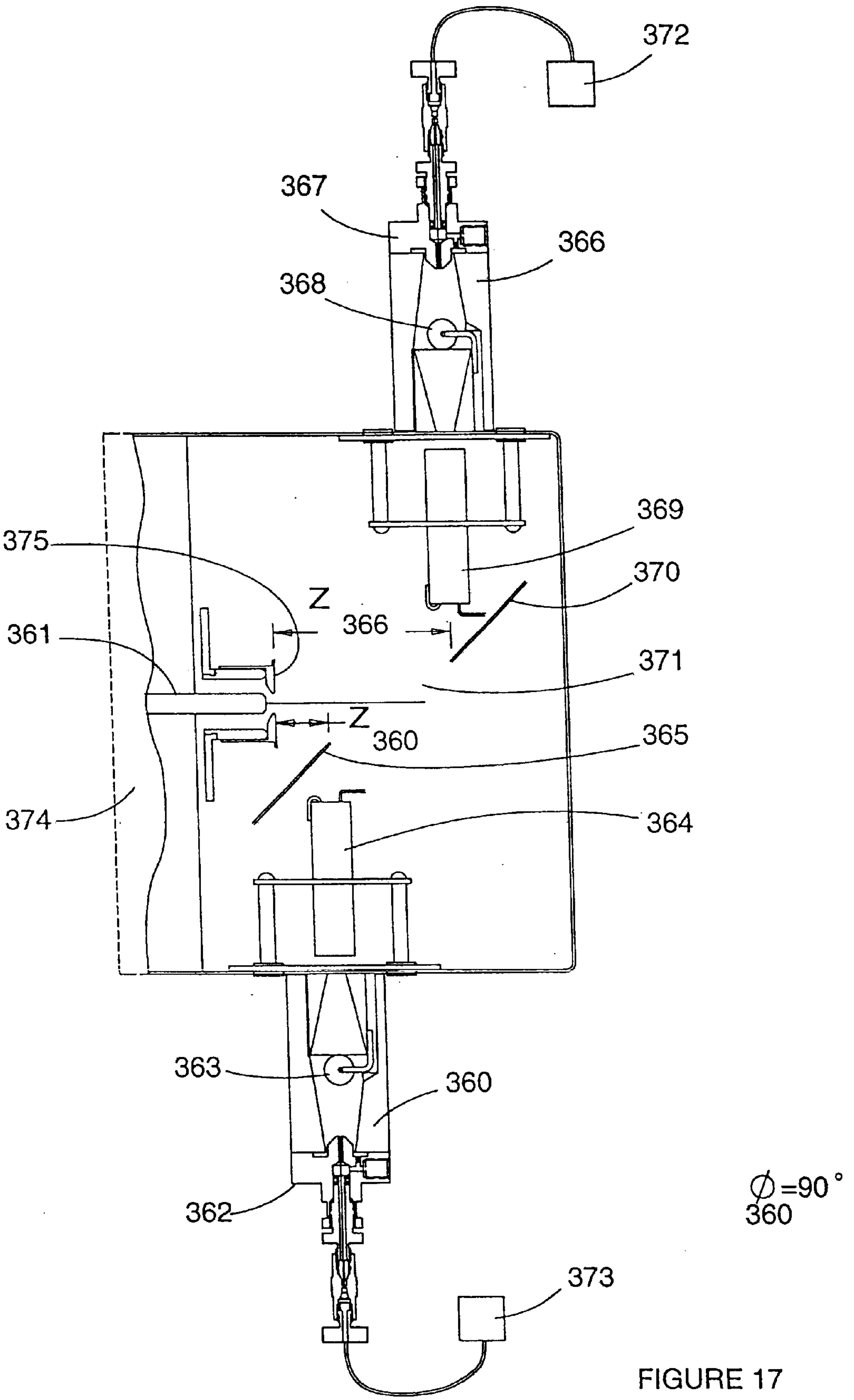
FIG. 17 is a diagram of an APCI source comprising two APCI probe and vaporizer assemblies which are configured to produce ions of opposite polarity.

An embodiment of an API source configured with a dual APCI vaporizer, corona discharge needle and probe assembly is diagrammed in FIG. 17. One APCI probe assembly 366 is positioned off-axis, $\phi_{366}$=90°, at a distance $Z_{366}$ from API source nosepiece 375. APCI probe assembly 366 comprises pneumatic nebulizer sample inlet probe assembly 367, optional droplet separator ball 368, vaporizer 369, and corona discharge needle 370. Sample solution supplied from liquid delivery system 372 is sprayed from inlet probe assembly 367. Sprayed droplets pass around separator ball 368 and into vaporizer 369 where the droplets evaporate to form a vapor. The vapor exiting vaporizer 369 is ionized in the corona discharge region at the tip of corona discharge needle 370. A second APCI probe assembly 360 is also positioned off-axis, $\phi_{360}$=90°, spaced a distance $Z_{360}$ from API source nosepiece 375. In the configuration shown dimension $Z_{360}$ is shorter than $Z_{366}$. APCI probe assembly 360 comprises pneumatic nebulizer sample inlet probe assembly 362, optional droplet separator ball 363, vaporizer 364, and corona discharge needle 365. Inlet probe 362 sprays sample solution delivered from liquid delivery system 373 into APCI probe assembly 360. For purposes of discussion, assume that the applied API source element electrical potentials and gas flows are set to produce positive ions from solutions sprayed, vaporized and ionized through APCI probe 366 and negative ions from solutions sprayed vaporized and ionized through APCI probe 360. The positive ions produced in the corona discharge region surrounding the tip of corona discharge needle 370 are drawn towards the capillary 361, end plate 375, and corona discharge needle 365 due the applied electrical potentials. The negative ions produced in the corona discharge region surrounding the tip of corona discharge needle 365 are drawn towards corona discharge needle 370 due to the applied electrical potentials. The positive and negative ions interact and react at atmospheric pressure in region 371. The positive and negative ion interaction at atmospheric pressure will result in the neutralization of some the positive and negative ions, however, some positive ions after reacting can be re-ionized and subsequently drawn towards nose piece 375 and capillary 361 by the applied electrical potentials. Positive ions are swept into vacuum through the bore of capillary where they are mass analyzed by a mass spectrometer located in vacuum region 374. A higher number of positive solvent ions may be introduced from a higher solution flow rate through APCI probe assembly 366 compared with the solution flow rate delivered to APCI probe assembly 360. The higher abundance of positive solvent ions ion in mixing region 371 will increase the efficiency of re-ionization of positive ions after a neutralization reaction with a negative ion. Reversing voltage polarities in API source, will allow negative ions to be produced from solution delivered to APCI probe assembly 366 and positive ions to be produced from solution delivered to APCI probe assembly 360. A portion of the reacted negative ion population will be swept into vacuum and mass to charge analyzed.

Variations of APCI probe locations can be configured to achieve multiple sample ion-ion interaction from different solutions sprayed from multiple APCI probe assemblies. More than two APCI probes can be configured in an API source positioned at angles $\phi_{I \ldots i}$ ranging from 0 to 180 degrees and rotation angles $\theta_{I \ldots i}$ ranging from 0 to 360 degrees. Selected neutral gas composition can be added to nebulizer or counter current drying gas study ion-neutral reactions in relation to ion-ion interactions.

Figure 18:
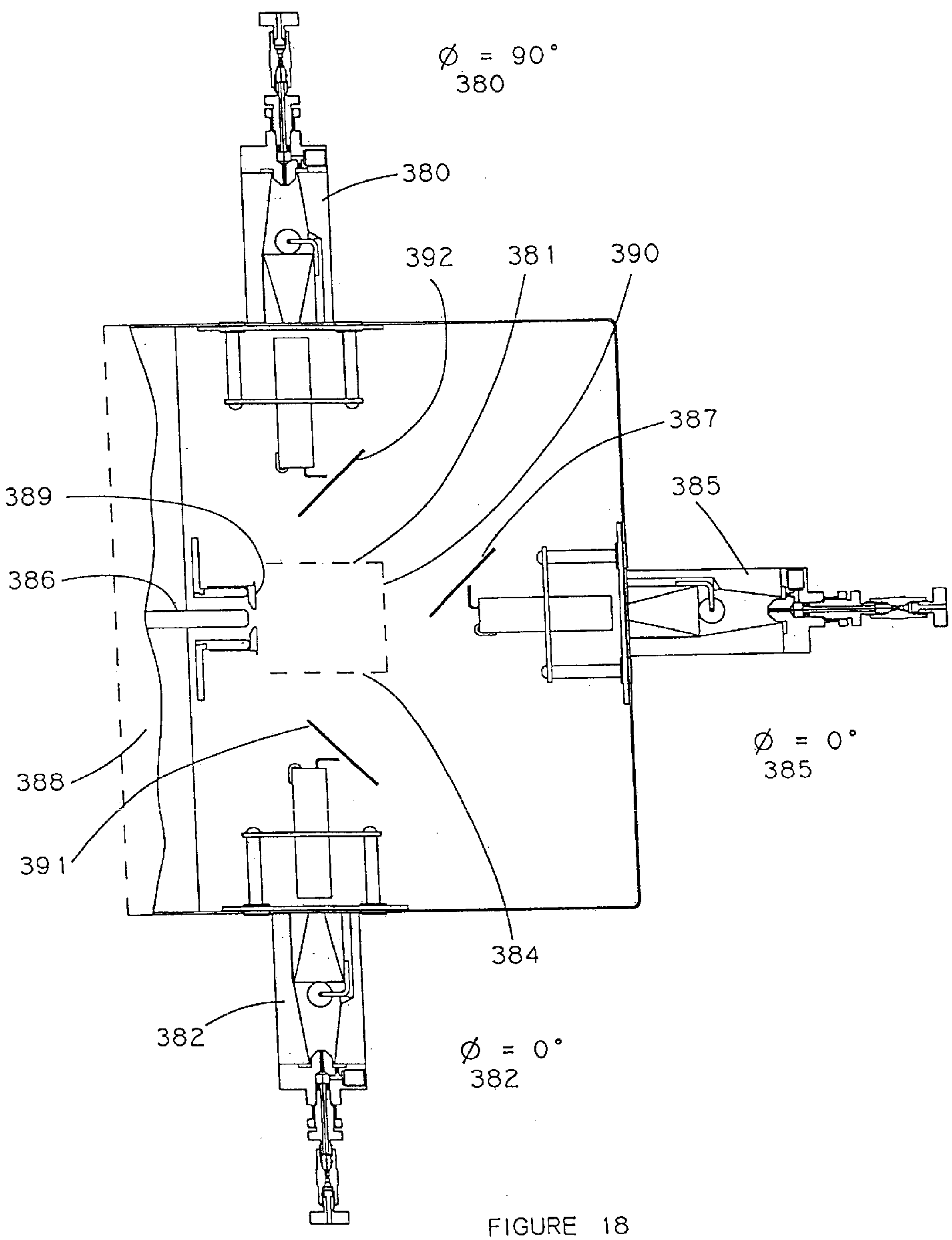
FIG. 18 is a diagram of an APCI source comprising three APCI probe and vaporizer assemblies which are configured to produce a mixture of positive and negative ions simultaneously.

An embodiment of an API source configured with three APCI probe assemblies positioned to facilitate the study of ion-ion interactions at atmospheric pressure is shown in FIG. 18. APCI probe assembly 380 is positioned at angles $\phi_{380}$=90° and, $\theta_{380}$=270° with electrical potentials applied relative to grid 381 to produce negative ions in the corona discharge region surrounding the tip of corona discharge needle 392. A second APCI probe assembly 382 is positioned at angles $\phi_{382}$=90° and $\theta_{382}$=90° with electrical potentials applied relative to grid 384 to produce negative ions. A third APCI probe assembly 385 is positioned at angles $\phi$=0 and $\theta$=0 with electrical potentials applied relative to grid 390 to produce positive ions. The positive and negative ions produced from APCI probe assemblies 380, 382 and 385 pass through grids 381, 384 and 390 respectively and interact at atmospheric pressure. Two grids 381 and 384 are positioned between APCI probe assembly 385 and the entrance of capillary 386. Interaction between ions of opposite polarity results in the cause the neutralization of the positive and negative ions, however, the positive sample and solvent ions supplied from APCI probe assembly 385 can re-ionize reacted product molecules. The newly formed ion will be drawn towards nose piece 389 and capillary 386 by the applied electric fields. Ions swept through the bore of capillary 386 into vacuum are mass analyzed with a mass spectrometer and ion detector. The applied voltage polarities can be switched to enable the mass analysis of a negative reacted ion population. One or more APCI probes assemblies configured in the embodiment shown in FIG. 18 can be removed or replaced with Electrospray probe assemblies. API sources configured with multiple APCI probe assemblies can be used to study a range of ion-ion interactions and reactions.

Multiple ES and APCI inlet probe configurations as diagrammed in FIGS. 1, 2, 3, 5, 6, 8, 9, 11, 14, 16, 17 and 18 show individual solution delivery systems connected to each inlet probe tip. alternatively, multiple sample delivery systems can be switched directed to supply solution to an individual inlet probe tip. The combination of multiple sample inlet lines and multiple nebulizers can be configured in a single API source assembly. Several combinations of multiple probe tip positions can be configured by one skilled in the art and the invention is not limited to those multiple ES and APCI probe embodiments specifically described herein.

Having described this invention with respect to specific embodiments, it is to be understood that the description is not meant as a limitation since further modifications and variations may be apparent or may suggest themselves to those skilled in the art. It is intended that the present application cover all such modifications and variations as fall within the scope of the appended claims.

References Cited:

The following references are referred to in this document, the disclosures of which are hereby incorporated herein by reference:

| U.S. Patent Documents: | | |
|---|---|---|
| 4,542,293 | Sep. 17, 1985 | Fenn, John B., Yamashita, Masamichi, Whitehouse, Craig. |
| 5,495,108 | Feb. 27, 1996 | Apffel, James; Werlich, Mark; Bertach, James. |

Publications:

R. Kostianinen and A. P. Bruins, Proceedings of the 41st ASMS Conference on Mass Spectrometry, 744a, 1993.

R. R. Ogorzalek Loo, Harold R. Udseth, and Richard Smith, Proceedings of the 39th ASMS Conference on Mass Spectrometry and Allied Topics, 266–267, 1991.

R. R. Ogorzalek Loo, Harold R. Udseth, and Richard Smith, J. Phys. Chem., 6412–6415, 1991.

Richard D. Smith, Joseph A. Loo, Rachel R. Ogorzalek Loo, Mark Busman, and Harold R. Udseth, Mass Spectrometry Reviews, 10, 359–451,1991.

Bordoli, Woolfit and Bateman, Proceedings of the 43th ASMS Conference on Mass Spectrometry and Allied Topics, 98, 1995.

We claim:

1. An apparatus for producing ions from chemical species comprising:

a. an ion source operated substantially at atmospheric pressure which produces ions from sample bearing solutions;

b. at least two probes, said at least two probes comprising a first probe for introducing a first solution into said ion source and a second probe for introducing a second solution into said ion source, said ion source being configured to allow simultaneous production of ions from said first solution and said second solution; and c. Wherein said at least two probes are substantially parallel to each other.

2. An apparatus according to claim 1, wherein said ion source comprises an Electrospray means.

3. An apparatus according to claim 1, wherein said ion source comprises an Electrospray with nebulization assist means.

4. An apparatus according to claim 1, wherein said ion source comprises an Atmospheric Pressure Chemical ionization means.

5. An apparatus according to claim 1, wherein said ion source comprises both an Electrospray and an Atmospheric Pressure Chemical Ionization means.

6. An apparatus according to claim 1, wherein said ion source comprises an Inductively Coupled Plasma means.

7. An apparatus for analyzing chemical species comprising:

a. an ion source operated substantially at atmospheric pressure which produces ions from sample bearing solutions;

b. at least two probes, said at least two probes being substantially parallel to each other and comprising a first probe for introducing a first solution into said ion source and a second probe for introducing a second solution into said ion source, said ion source being configured to allow simultaneous production of ions from said first solution and said second solution; and, c. a mass analyzer.

8. An apparatus according to claim 7, wherein said ion source comprises an Electrospray means.

9. An apparatus according to claim 7, wherein said ion source comprises an Electrospray with nebulization assist means.

10. An apparatus according to claim 7, wherein said ion source comprises an Atmospheric Pressure Chemical Ionization means.

11. An apparatus according to claim 7, wherein said ion source comprises both an Electrospray and an Atmospheric Pressure Chemical Ionization means.

12. An apparatus according to claim 7, wherein said ion source comprises an Inductively Coupled Plasma means.

13. An apparatus according to claim 7, wherein said mass analyzer comprises a Time-Of-Flight mass spectrometer.

14. An apparatus according to claim 7, wherein said mass comprises a Quadrupole mass spectrometer.

15. An apparatus according to claim 7, wherein said mass analyzer comprises an Ion Trap mass spectrometer.

16. An apparatus according to claim 7, wherein said mass analyzer comprises a Fourier Transform mass spectrometer.

17. An apparatus according to claim 7, wherein said mass analyzer comprises a magnetic sector mass spectrometer.

18. An apparatus according to claim 7, wherein said mass analyzer comprises a hybrid mass spectrometer.

19. An apparatus according to claim 7, wherein at least one of said probes comprises a microtip.

20. An apparatus for producing ions from chemical species comprising:

a. an ion source operated substantially at atmospheric pressure which produces ions from solutions;

b. at least two probes, said at least two probes being substantially parallel to each other and comprising a first probe for introducing a first solution into said ion source end a second probe for introducing a second solution into said ion source, said ion source being configured to allow simultaneous production of ions from said first solution and said second solution; and, c. wherein the positions of said first probe and said second probe are fixed when said first solution and said second solution are introduced into said ion source.

21. An apparatus according to claim 20, wherein said ion source comprises en Electrospray means.

22. An apparatus according to claim 20, wherein said ion source comprises an Electrospray with nebulization assist means.

23. An apparatus according to claim 20, wherein said ion source comprises an Atmospheric Pressure Chemical Ionization means.

24. An apparatus according to claim 20, wherein said ion source comprises both an Electrospray and an Atmospheric Pressure Chemical Ionization means.

25. An apparatus according to claim 20, wherein said ion source comprises an Inductively Coupled Plasma means.

26. An apparatus according to claim 20, wherein at least one of said probes comprises a microtip.

27. An apparatus for analyzing chemical species comprising:

a. an ion source which produces ions from sample bearing solutions;

b. at least two probes, said at least two probes being substantially parallel to each other and comprising a first probe for introducing a first solution into said ion source and a second probe for introducing a second solution into said ion source, said ion source being configured to allow simultaneous production of ions from said first solution and said second solution; and, c. and wherein said ion source comprises an Electrospray ionization means for producing ions from both said first solution and said second solution.

28. An apparatus according to claim 27, wherein said Electrospray ionization means comprises nebulization assist.

29. An apparatus according to claim 27, wherein said ion source comprises bath gas flow to aid in drying Electrosprayed charged droplets.

30. An apparatus according to claim 27, wherein said apparatus further comprises a Time-Of-Flight mass spectrometer.

31. An apparatus according to claim 27, wherein said apparatus further comprises a Quadrupole mass spectrometer.

32. An apparatus according to claim 27, wherein said apparatus further comprises an Ion Trap mass spectrometer.

33. An apparatus according to claim 27, wherein said apparatus further comprises a Fourier Transform mass spectrometer.

34. An apparatus according to claim 27, wherein said apparatus further comprises a magnetic sector mass spectrometer.

35. An apparatus according to claim 27, wherein said apparatus further comprises a hybrid mass spectrometer.

36. An apparatus according to claim 27, wherein at least one of said probes comprises a microtip.

37. An apparatus for analyzing chemical species comprising:

a. an ion source which produces ions from sample bearing solutions;

b. at least two probes, said at least two probes being substantially parallel to each other and comprising a first probe for introducing a first solution into said ion source and a second probe for introducing a second solution into said ion source, said ion source being configured to allow simultaneous production of ions from said first solution and said second solution; and, c. wherein said ion source comprises an Atmospheric Pressure Chemical Ionization means for producing ions from both said first solution and said second solution.

38. An apparatus according to claim 37, wherein said apparatus further comprises a Time-Of-Flight mass spectrometer.

39. An apparatus according to claim 37, wherein said apparatus further comprises a Quadrupole mass spectrometer.

40. An apparatus according to claim 37, wherein said apparatus further comprises an Ion Trap mass spectrometer.

41. An apparatus according to claim 37, wherein said apparatus further comprises a Fourier Transform mass spectrometer.

42. An apparatus according to claim 37, wherein said apparatus further comprises a magnetic sector mass spectrometer.

43. An apparatus according to claim 37, wherein said apparatus further comprises a hybrid mass spectrometer.

44. An apparatus for analyzing chemical species comprising:

a. an ion source which produces ions from sample bearing solutions;

b. at least two probes, said at least two probes being substantially parallel to each other and comprising a first probe for introducing a first solution into said ion source and a second probe for introducing a second solution into said ion source, said ion source being configured to allow simultaneous production of ions from said first solution and said second solution;

c. wherein said ion source comprises an Electrospray ionization means for producing ions from said first solution; and, d. wherein said ion source further comprises an Atmospheric Pressure Chemical Ionization means for producing ions from said second solution.

45. An apparatus according to claim 44, wherein said Electrospray ionization means comprises nebulization assist.

46. An apparatus according to claim 44, wherein at least one of said probes is an Electrospray probe which comprises three tube layers at its exit tip.

47. An apparatus according to claim 44, wherein said apparatus further comprises a Time-Of-Flight mass spectrometer.

48. An apparatus according to claim 44, wherein said apparatus further comprises a Quadrupole mass spectrometer.

49. An apparatus according to claim 44, wherein said apparatus further comprises an Ion Trap mass spectrometer.

50. An apparatus according to claim 44, wherein said apparatus further comprises a Fourier Transform mass spectrometer.

51. An apparatus according to claim 44, wherein said apparatus further comprises a magnetic sector mass spectrometer.

52. An apparatus according to claim 44, wherein said apparatus further comprises a hybrid mass spectrometer.

53. An apparatus for analyzing chemical species comprising:

a. an ion source which produces ions from sample bearing solutions;

b. at least two probes, said at least two probes being substantially parallel to each other and comprising a first probe for introducing a first solution into said ion source and a second probe for introducing a second solution into said ion source, said ion source being configured to allow simultaneous production of ions from said first solution and said second solution; and, c. a chemical separation system for delivering at least one of said solutions to at least one of said probes.

54. An apparatus according to claim 53, wherein said chemical separation system is a liquid chromatography system.

55. An apparatus according to claim 53, wherein said chemical separation system is a capillary electrophoresis system.

56. An apparatus according to claim 53, wherein said chemical separation system is a capillary electrophoresis chromatography system.

57. An apparatus according to claim 53, wherein said chemical separation system comprises a liquid chromatography system and a capillary electrophoresis system.

58. An apparatus according to claim 53, wherein said ion source comprises an Electrospray means.

59. An apparatus according to claim 53, wherein said ion source comprises an Electrospray with nebulization assist means.

60. An apparatus according to claim 53, wherein said ion source comprises an Atmospheric Pressure Chemical Ionization means.

61. An apparatus according to claim 53, wherein said ion source comprises both an Electrospray and an Atmospheric Pressure Chemical Ionization means.

62. An apparatus according to claim 53, wherein said ion source comprises an Inductively Coupled Plasma means.

63. An apparatus according to claim 53, further comprising at least one liquid delivery system with injector valve.

64. An apparatus according to claim 53, further comprising at least two liquid delivery systems each comprising an injector valve.

65. An apparatus according to claim 53, further comprising at least one liquid delivery system with injector valve and at least one liquid chromatography system.

66. An apparatus for analyzing chemical species comprising:

a. an ion source operated substantially at atmospheric pressure which produces ions from sample bearing solutions;

b. at least two probes, said at least two probes being substantially parallel to each other and comprising a first probe for introducing a first solution into said ion source and a second probe for introducing a second solution into said ion source, said ion source being configured to allow simultaneous production of ions from said first solution and said second solution; and c. chemical separation systems comprising a first chemical separation system for delivering said first solution to said first probe and a second chemical separation system for delivering said second solution to said second probe.

67. An apparatus according to claim 66, wherein at least one of said chemical separation systems is a liquid chromatography system.

68. An apparatus according to claim 66, wherein at least one of said chemical separation systems is a capillary electrophoresis system.

69. An apparatus according to claim 66, wherein at least one of said chemical separation systems is a capillary electrophoresis chromatography system.

70. An apparatus according to claim 66, wherein said chemical separation systems comprise a liquid chromatography system and a capillary electrophoresis system.

71. An apparatus according to claim 66, wherein said ion source comprises an Electrospray means.

72. An apparatus according to claim 66, wherein said ion source comprises an Electrospray with nebulization assist means.

73. An apparatus according to claim 66, wherein said ion source comprises an Atmospheric Pressure Chemical Ionization means.

74. An apparatus according to claim 66, wherein said ion source comprises both an Electrospray and an Atmospheric Pressure Chemical Ionization means.

75. An apparatus according to claim 66, wherein said ion source comprises an Inductively Coupled Plasma means.

* * * * *